United States Patent
Scelers

(10) Patent No.: US 7,247,125 B2
(45) Date of Patent: Jul. 24, 2007

(54) TORQUE CONVERTER CONTROLLER STUCK-ON TEST IN A MULTIPLEX DEVICE

(75) Inventor: Herve Scelers, Illkirch-Graffenstaden (FR)

(73) Assignee: General Motors Corporation, Detroit, MI (US)

( * ) Notice: Subject to any disclaimer, the term of this patent is extended or adjusted under 35 U.S.C. 154(b) by 167 days.

(21) Appl. No.: 10/836,893

(22) Filed: Apr. 30, 2004

(65) Prior Publication Data

US 2005/0245353 A1 Nov. 3, 2005

(51) Int. Cl.
*F16H 61/26* (2006.01)
(52) U.S. Cl. .................. 477/127; 477/168; 477/180; 477/906; 701/34
(58) Field of Classification Search ................ 477/127, 477/168, 180, 906; 475/209; 701/29, 34, 701/67, 68; 192/3.27, 51
See application file for complete search history.

(56) References Cited

U.S. PATENT DOCUMENTS

| | | | |
|---|---|---|---|
| 4,075,901 A | 2/1978 | Freyermuth | |
| 4,122,732 A | 10/1978 | Chana | |
| 4,509,125 A | 4/1985 | Fattic et al. | |
| 4,539,866 A | 9/1985 | Koivunen | |
| 4,747,809 A | 5/1988 | Vahabzadeh | |
| 5,047,937 A | 9/1991 | Vahabzadeh et al. | |
| 5,055,094 A | 10/1991 | Cataldo | |
| 5,067,603 A * | 11/1991 | Kato et al. | 477/39 |
| 5,350,047 A * | 9/1994 | Kimura et al. | 192/87.13 |
| 5,803,858 A | 9/1998 | Haka | |
| 5,803,859 A | 9/1998 | Haka | |
| 5,895,335 A | 4/1999 | Haka | |
| 5,924,954 A | 7/1999 | Vukovich et al. | |
| 5,997,431 A | 12/1999 | Vukovich et al. | |
| 6,045,477 A | 4/2000 | Schmidt | |
| 6,287,227 B1 | 9/2001 | Vahabzadeh et al. | |
| 6,343,615 B1 * | 2/2002 | Miller et al. | 137/202 |
| 6,447,422 B1 | 9/2002 | Haka | |
| 2003/0144105 A1 | 7/2003 | O'Hora | |

\* cited by examiner

*Primary Examiner*—David D. Le
(74) *Attorney, Agent, or Firm*—Christopher DeVries

(57) ABSTRACT

A device and method for fluid delivery in a continuously variable transmission that includes a valve assembly, configured to distribute a fluid, having a first position and a second position. A forward clutch, a reverse clutch, and a torque converter are connected to the valve assembly. The valve assembly in the first position regulates either the forward clutch or the reverse clutch and opens the torque converter. In the second position, the valve assembly closes the forward clutch or the reverse clutch and regulates the torque converter. A controller commands the valve assembly to the first position and detects if the valve assembly is stuck in the second position. The controller is able to detect the valve assembly stuck in the second position and attempt to unstuck it while the continuously variable transmission is in drive.

15 Claims, 15 Drawing Sheets

US 7,247,125 B2

TORQUE CONVERTER CONTROLLER STUCK-ON TEST IN A MULTIPLEX DEVICE

FIELD

The present invention relates to vehicle transmissions and more particularly to a diagnostic system for detecting a stuck valve in a continuously variable transmission.

BACKGROUND

Continuously variable transmissions (CVTs) present many advantages over the conventional automatic step gear transmission including efficiency gains and a reduction in mechanical complexity. The continuously variable transmission may utilize a torque converter and neutral idle and garage shift features. Transmission fluid can be used to fluidly couple various components of the CVT.

Multiplex devices, similar to a modified conventional combination of valve assemblies, may be used in the continuously variable transmission to route the transmission fluid to various components. An exemplary implementation of a multiplex device is illustrated in FIGS. 1, 2A, 2B, 3A, and 3B, where an exemplary multiplex device transmission control is generally indicated by reference numeral 10. The transmission control system 10 includes a multiplex device 12, which is supplied the transmission fluid at a controllable pressure by a transmission pump 14. It should be appreciated that the multiplex device 12 may be indirectly connected to the transmission pump 14 and this connection may vary considerably between transmission configurations. Furthermore, the multiplex device 12 directs transmission fluid to other components of the transmission control system 10 but does not attenuate the pressure of the transmission fluid beyond typical mechanical losses.

The multiplex device 12 is further connected to a multiplex control 16, which selectively switches the multiplex device 12 between an on position 12a (shown in FIGS. 2A and 2B) and an off position 12b (shown in FIGS. 3A and 3B). The multiplex device 12 selectively delivers transmission fluid through four delivery paths. The first path is indicated by reference numeral 18. The second, third, and fourth path are indicated by reference numerals 20, 22, and 24, respectively. It will be appreciated that the multiplex device 12 utilizes two of the four delivery paths in one position and then utilizes the other two delivery paths in the other position. For example, the multiplex device 12 in the on position 12a (FIGS. 2A and 2B) communicates fluid through the first delivery path 18 and third delivery path 22. The multiplex device 12 in the off position 12b (FIGS. 3A and 3B) communicates fluid through the second delivery path 20 and the fourth delivery path 24.

The NI/GS control valve 26 is actuated by a dual valve control 28, which also actuates a torque converter clutch (TCC) control valve 30. The dual control valve 28 is configured to actuate the NI/GS control valve 26 in a way opposite the TCC control valve 30. More specifically, when the dual control valve 28 opens the NI/GS control valve 26 to a maximum position, the dual control valve 28 controls the TCC control valve 30 to a minimum position. When the dual control valve 28 controls the NI/GS control valve 26 to a minimum position, the dual control valve 28 opens the TCC control valve 30 to a maximum position. The maximum position, with respect to the NI/GS control valve 26 and the TCC control valve 30, is defined as allowing maximum flow through the valves 26 and 30, which necessarily means the fluid pressure is not attenuated as it travels from transmission pump 14 though the multiplex device 12 to the valves 26 and 30 except for typical mechanical losses. The minimum position, on the other hand, is defined as reducing or attenuating the pressure of the transmission fluid as it travels through the valves 26 and 30 when compared to the transmission fluid pressure experienced at the multiplexer device 12.

The NI/GS control valve 26 is fluidly connected to a forward/reverse clutch 32, which directs the transmission fluid to either a modified conventional forward clutch 34 or a modified conventional reverse clutch 36. The forward clutch 34 and the reverse clutch 36 are components of the transmission 38, which are connected to an engine 40. When the transmission fluid is directed to the NI/GS control valve 26 that is in the maximum position, the forward/reverse valve 32 routes transmission fluid at a maximum pressure from the NI/GS Control Valve 26 to either the forward clutch 34 or the reverse clutch 36. When the transmission fluid is directed to the NI/GS control valve 26 that is in the minimum position, the forward/reverse valve 32 routes transmission fluid at a minimum pressure from the NI/GS Control Valve 26 to either the forward clutch 34 or the reverse clutch 36. When either the forward clutch 34 or the reverse clutch 36 receives transmission fluid at a maximum pressure, either the forward clutch 34 or the reverse clutch 36 locks. In contrast, when either the forward clutch 34 or the reverse clutch 36 receives transmission fluid at a minimum pressure, either the forward clutch 34 or the reverse clutch 36 opens.

Maximum pressure is defined as the transmission fluid pressure at a certain point within the control system 10 being about equal to the transmission fluid pressure experienced at the multiplexer device 12, acknowledging typical mechanical losses. Minimum pressure is defined as the transmission fluid pressure at a certain point within the transmission control system 10 being reduced, when compared to the transmission fluid pressure experienced at the multiplexer device 12. In the various embodiments, maximum transmission fluid pressure is about 290 psi (about 2000 kPa) and minimum fluid pressure is about 0.3 psi (about 2 kPa). Minimum pressure further refers to an adequate amount of transmission fluid pressure required to cool and maintain the particular component in the transmission but not necessarily control it.

The TCC control valve 30 is fluidly connected to a modified conventional torque converter clutch 42 (TCC 42). The TCC 42 is a component of the transmission 38, which is connected to an engine 40. When the transmission fluid is directed to the TCC Control Valve 30 that is in the maximum position, the TCC 42 receives transmission fluid at a maximum pressure from the TCC Control Valve 30. It follows that when the TCC control valve 30 that is in the minimum position, the TCC 42 receives transmission fluid at a minimum pressure from the TCC Control Valve 30. When the TCC 42 receives transmission fluid at a maximum pressure, the TCC 42 locks. A locked TCC 42 causes a torque converter (not shown) that is conventionally connected to the transmission 38 to lock, which means the torque converter does not slip or experiences very little slippage. In contrast, when the TCC 42 receives transmission fluid at a minimum pressure, TCC 42 opens, which causes the torque converter to slip.

Table 1 below indicates the various positions of the components of the transmission control system 10, shown in seven exemplary modes. Each mode represents possible exemplary configurations associated with the multiplex drive 12, the NI-GS control valve 26, the forward-reverse valve 32, the forward clutch 34, and the reverse clutch 36.

The labels of Maximum and Minimum in the column labeled NI-GS control valve 26 are in reference to the definitions noted above. Bypassed is defined to mean that the transmission fluid does not flow to this component. As shown in FIG. 2, for example, when the multiplex device 12 is in the on position 12a, no transmission fluid flows to the NI-GS control valve 26. As such, the NI-GS control valve 26 is bypassed, as the transmission fluid flows directly from the multiplex device 12 to the forward/reverse clutch 32.

TABLE 1

| Modes | Multiplex Device | NI-GS control valve (26) | forward-reverse valve (32) | forward clutch (34) | reverse clutch (36) |
|---|---|---|---|---|---|
| 0 | Off Position | N/A | No Forward No Reverse | Open | Open |
| 1 | Off Position | Maximum | Forward | Locked | Open |
| 2 | Off Position | Maximum | Reverse | Open | Locked |
| 3 | Off Position | Minimum | Forward | Open | Open |
| 4 | Off Position | Minimum | Reverse | Open | Open |
| 5 | On Position | Bypassed Minimum | Forward | Locked | Open |
| 6 | On Position | Bypassed Maximum | Forward | Locked | Open |

Table 2 below indicates the various positions of the components of the transmission control system 10, shown in the same seven different modes. Each mode represents possible exemplary configurations associated with the multiplex device 12, the TCC control valve 30, and the TCC 42. The labels of Maximum and Minimum in the column labeled TCC control valve 30 are in reference to the definitions noted above. Bypassed is defined to mean that the transmission fluid does not flow to this component. As shown in FIG. 3, for example, when the multiplex device 12 is in the off position 12a, no transmission fluid flows to the TCC control valve 30. As such, the TCC control valve 30 is bypassed, as the transmission fluid flows directly from the multiplex device 12 to the TCC 42.

| Modes | Multiplex Device (12) | TCC control valve (30) | TCC (42) |
|---|---|---|---|
| 0 | Off Position | Bypassed Minimum | Open |
| 1 | Off Position | Bypassed Minimum | Open |
| 2 | Off Position | Bypassed Maximum | Open |
| 3 | Off Position | Bypassed Maximum | Open |
| 4 | Off Position | Bypassed Maximum | Open |
| 5 | On Position | Minimum | Open |
| 6 | On Position | Minimum | Open |

With reference to FIGS. 3A and 3B and Tables 1 and 2, the multiplex device 12 is shown in the off position 12b. Modes 1-4 in Tables 1 and 2 indicated possible configurations of the components of the transmission control system 10. Mode 1 refers to the multiplex device 12 in the off position 12b, the forward-reverse valve 32 in a forward position 32a (FIG. 3A), and the NI-GS control valve 26 in a maximum position. Mode 2 is identical to Mode 1 except the forward-reverse valve 32 is in a reverse position 32b (FIG. 3B). In mode 1 and 2, there is no transmission fluid directed though the first and the third delivery path 18 and 22 and, therefore, no transmission fluid is directed to the TCC control valve 30. Because the TCC control valve 30 is bypassed, transmission fluid is delivered directly from the multiplex device 12 at a minimum pressure to the TCC 42. Because transmission fluid is directed to the NI-GS Control Valve 26 and then to either the forward clutch 34 or reverse clutch 36 (depending on the position of the forward/reverse valve 32), the NI-GS control valve 26 is able to regulate either the forward clutch 34 or reverse clutch 36 accordingly.

Mode 3 is identical to Mode 1 and Mode 4 is identical to Mode 2 except the NI-GS control valve 26 is in a minimum position in Mode 3 and Mode 4 . Because transmission fluid is directed to the NI-GS control valve 26 set to the minimum pressure, either the forward clutch 34 or reverse clutch 36 (depending on the position of the forward/reverse valve 32) will remain open. It will be appreciated that when the NI-GS control valve 26 moves from the maximum position to the minimum position, the TCC control valve 30 moves from the minimum position to the maximum position because the dual control valve 28 controls control the two valves 26 and 30 oppositely.

With reference to FIGS. 2A and 2B and Tables 1 and 2, the multiplex device 12 is shown in the on position 12a. Modes 5 and 6 in Tables 1 and 2 indicated possible configurations of the components of the transmission control system 10. Mode 5 refers to the multiplex device 12 in the on position 12a, the forward-reverse valve 32 in a forward position 32a (FIG. 2A), and the NI-GS control valve 26 in a maximum position. In mode 5, there is no transmission fluid directed though the second and the fourth delivery path 20 and 24 and, therefore, no transmission fluid is directed to the NI-GS control valve 26. Because the NI-GS control valve 26 is bypassed, transmission fluid is delivered directly from the multiplex device 12 at a maximum pressure to the forward/reverse valve 32. Because transmission fluid is directed to the TCC control valve 30 and then to the TCC 42, the TCC Control Valve 30 is able to open or close the TCC 42 accordingly.

Mode 6 is identical to Mode 5 except the TCC control valve 30 is in a minimum position in Mode 6. Because transmission fluid is directed to the TCC control valve 30 set to the minimum pressure, the TCC 42 will remain open. It will be appreciated that when the TCC control valve 30 moves from the maximum position to the minimum position, the NI-GS Control Valve 26 moves from the minimum position to the maximum position because the dual control valve 28 controls control the two valves 26 and 30 oppositely.

A neutral-idle feature may be incorporated into an automatic transmission. In this example, a vehicle (not shown) comes to a stop. After a pre-determined period of time, the automatic transmission may initiate the neutral idle feature. More specifically, while waiting at the stop a driver may have the vehicle in a forward gear with a brake pedal pressed so that the vehicle is in gear but stopped. At this point, the transmission control system 10 may be in Mode 1; such that, the forward clutch 34 is locked and the TCC 42 is open. In this case, if the driver were to release the brake the vehicle would move forward, as the vehicle remains in gear even though the vehicle is stopped. To increase the efficiency of the engine 40, the transmission control system 10 may open the forward clutch 34 thus removing the load on the engine 40, which in turn may reduce fuel consumption and increase engine and transmission life.

To open the forward clutch, the multiplex device 12 must be in the off position 12b (FIGS. 3A and 3B) and the NI/GS control valve 26 must be in the minimum position. Because the NI/GS control valve 26 and the TCC control valve 30 are controlled by the same dual control valve 28, the TCC control valve 30 will be in the maximum position when the NI/GS control valve 26 is in the minimum position. If the multiplex device 12, however, is stuck in the on position 12a (FIGS. 2A and 2B), and the transmission control system 10 initiates the neutral idle feature, there is a possibility that the engine 40 will stall. More specifically, the NI/GS control valve 26 will still move from the maximum position to the minimum position in the attempt to unlock the forward clutch 34, which in turn forces the TCC control valve 30 from the minimum position to the maximum position. The multiplex device 12, however, is stuck in the on position 12a (FIGS. 2A and 2B) and transmission fluid is directed to the TCC control valve now in the maximum position. This scenario results in the forward clutch 34 being locked and the TCC 42 switching from open to being locked. If this scenario occurs, the engine 40 may stall.

A garage-shift feature may also be incorporated into an automatic transmission. In this example, a vehicle (not shown) comes to a stop and places the automatic transmission in either neutral or park. At this point, the automatic transmission may initiate the garage-shift feature. More specifically, the driver will either turn the ignition off or place the automatic transmission back into a forward or reverse drive gear to continue driving. Upon placing the automatic transmission back into a drive gear from either park or neutral, the automatic transmission will slowly engage the forward or reverse clutch accordingly to provide a smooth transition from stopped to forward or reverse motion. Not using the garage-shift feature may result in less attenuated or less smooth transition to forward or reverse motion from a stand still.

When the vehicle is parked and the automatic transmission is in either park or neutral, the transmission control system 10 is in Mode 0; such that, the multiplex device 12 is in the off position (FIG. 3A), the forward clutch 34 and the reverse clutch 36 are open, and the TCC 42 is open. Now when the driver shifts into a drive gear, the forward clutch 34 or reverse clutch 36 is slowly closed, to provide a gradual transition to forward or reverse motion. To slowly close the forward or reverse clutch, the multiplex device 12 must be in the off position 12b (FIGS. 3A and 3B) and the NI/GS control valve 26 must be moved from the minimum position to the maximum position. Because the NI/GS control valve 26 and the TCC control valve 30 are controlled by the same dual control valve 28, the TCC control valve will be move from the minimum position to the maximum position when the NI/GS control valve 26 moves to the minimum position.

If the multiplex device 12, however, is stuck in the on position 12a (FIGS. 2A and 2B), and the transmission control system 10 initiates the garage shift feature, there is a possibility that the engine 40 will stall. More specifically, the NI/GS control valve 26 will still move from the minimum position to the maximum position in the attempt to gradually lock the forward clutch 34 or reverse clutch 36. The forward clutch 34 or reverse clutch 36 must open first, which requires the NI/GS control valve 26 to move from a maximum position to a minimum position. The TCC control valve 30, therefore, moves from the minimum position to the maximum position. If, however, the multiplex device 12 is stuck in the on position 12a (FIGS. 2A and 2B) and transmission fluid is directed to the TCC control valve now in the maximum position. This scenario results in the forward clutch 34 or reverse clutch 36 being locked and the TCC 42 switching from open to being locked. If this scenario occurs when the vehicle is at a stand still the engine may stall.

In some instances, as noted above, the multiplex device 12 remains stuck in an on position when otherwise commanded to return to the off position. This failure, if gone undetected, may cause engine stall. Previous implementations of the multiplex device diagnostic to detect the multiplex device stuck in the on position have been limited to running the diagnostic only when the vehicle is in a park or neutral range. Further, the previous diagnostic was limited to transmission temperatures below 80° C.

SUMMARY

A device and method for fluid delivery in a continuously variable transmission that includes a valve assembly, configured to distribute a fluid, having a first position and a second position. A forward clutch, a reverse clutch, and a torque converter are connected to the valve assembly. The valve assembly in the first position regulates either the forward clutch or the reverse clutch and opens the torque converter. In the second position, the valve assembly closes the forward clutch or the reverse clutch and regulates the torque converter. A controller commands the valve assembly to the first position and detects if the valve assembly is stuck in the second position.

In another feature, the controller pulses the valve assembly in the second position to free the valve assembly.

In still another feature, the controller detects slippage of the torque converter to determine if the valve assembly is stuck in the second position.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION

Figure 4:
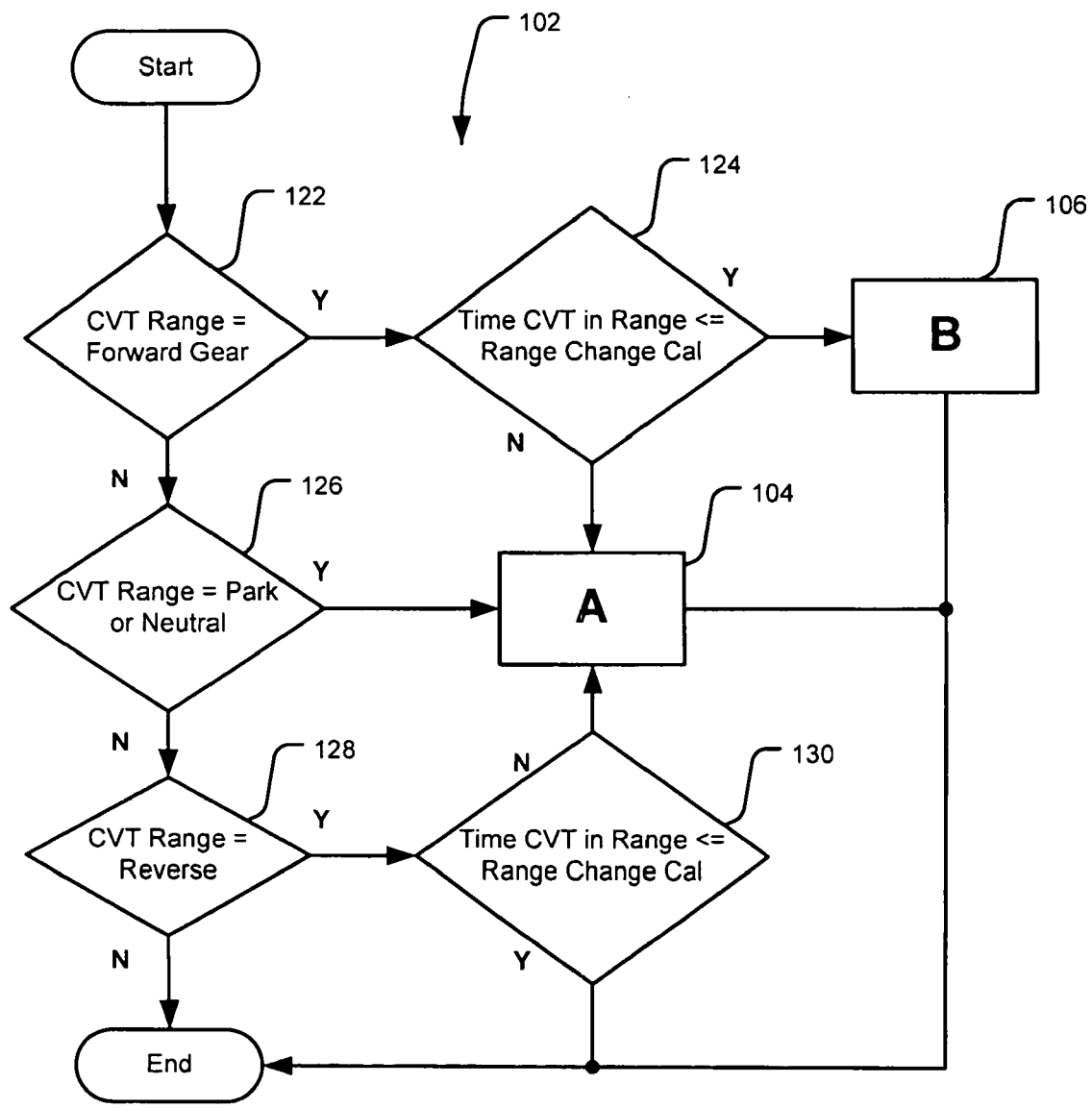
FIG. 4 is a flow chart representing a continuously variable transmission range determination module that detects a multiplex device stuck on in the diagnostic system.
Figure 5:
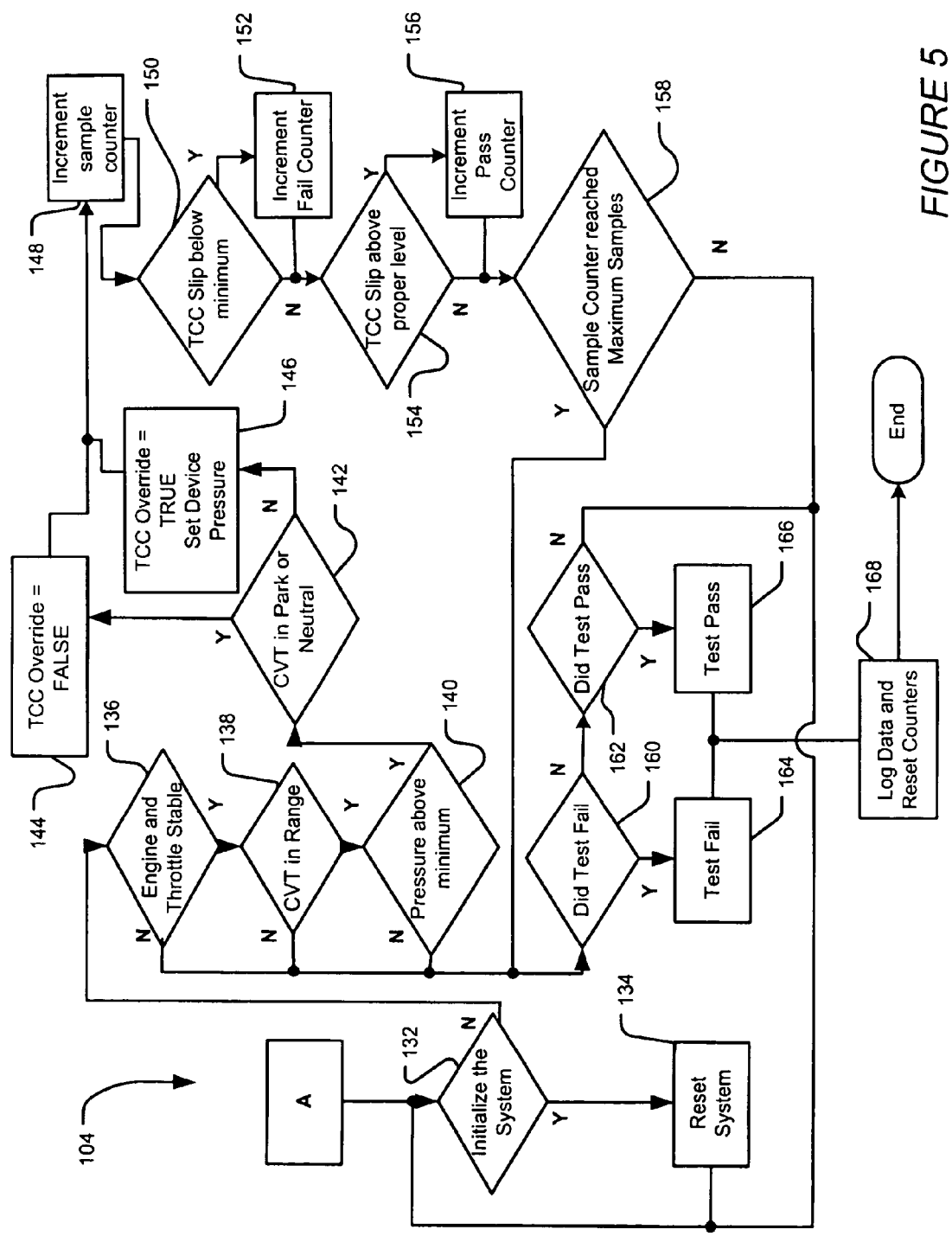
FIG. 5 is a flow chart representing a park/neutral module of the diagnostic system of FIG. 4.
Figure 6:
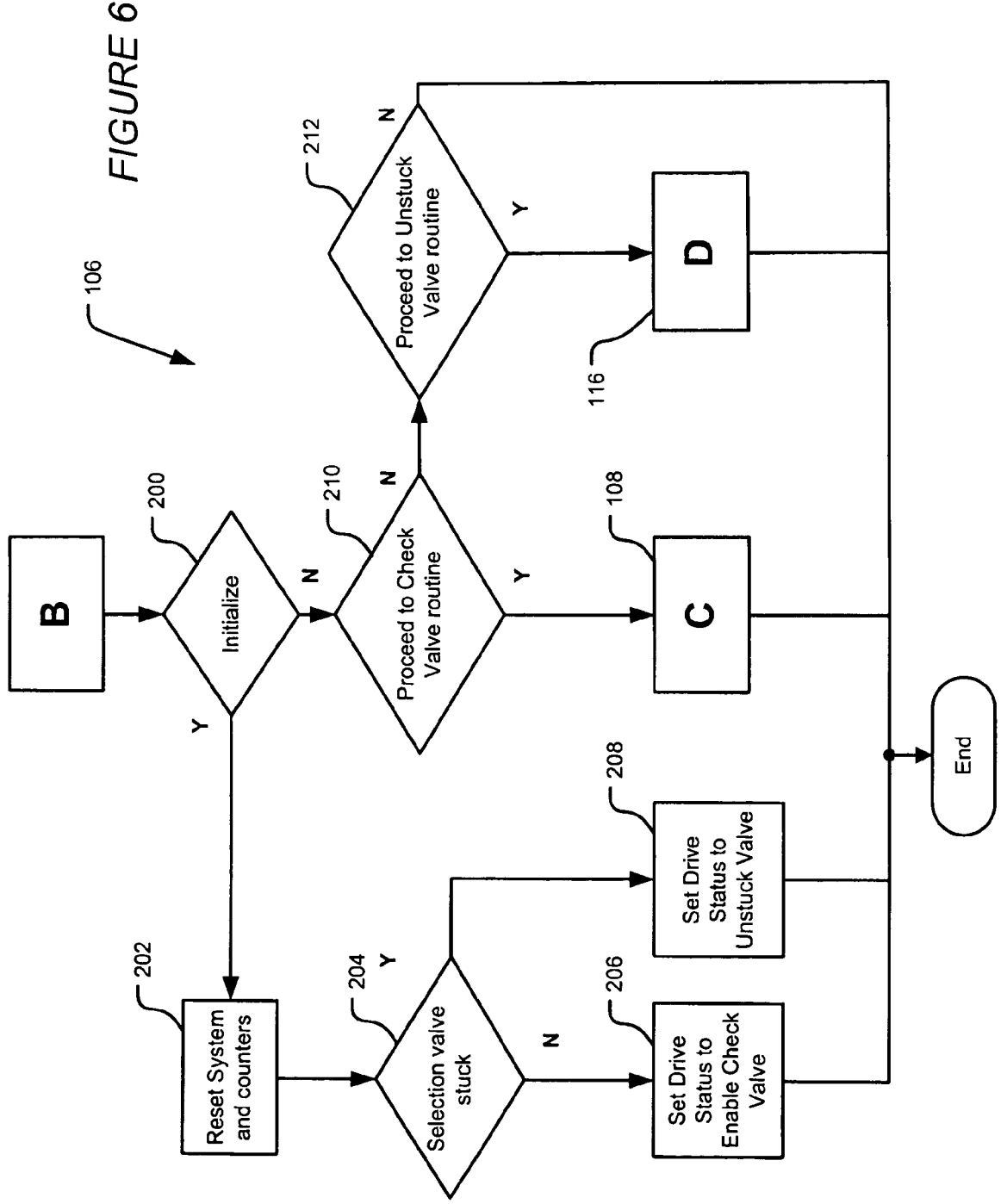
FIG. 6 is a flow chart representing a drive module of the diagnostic system of FIG. 4.
Figure 7:
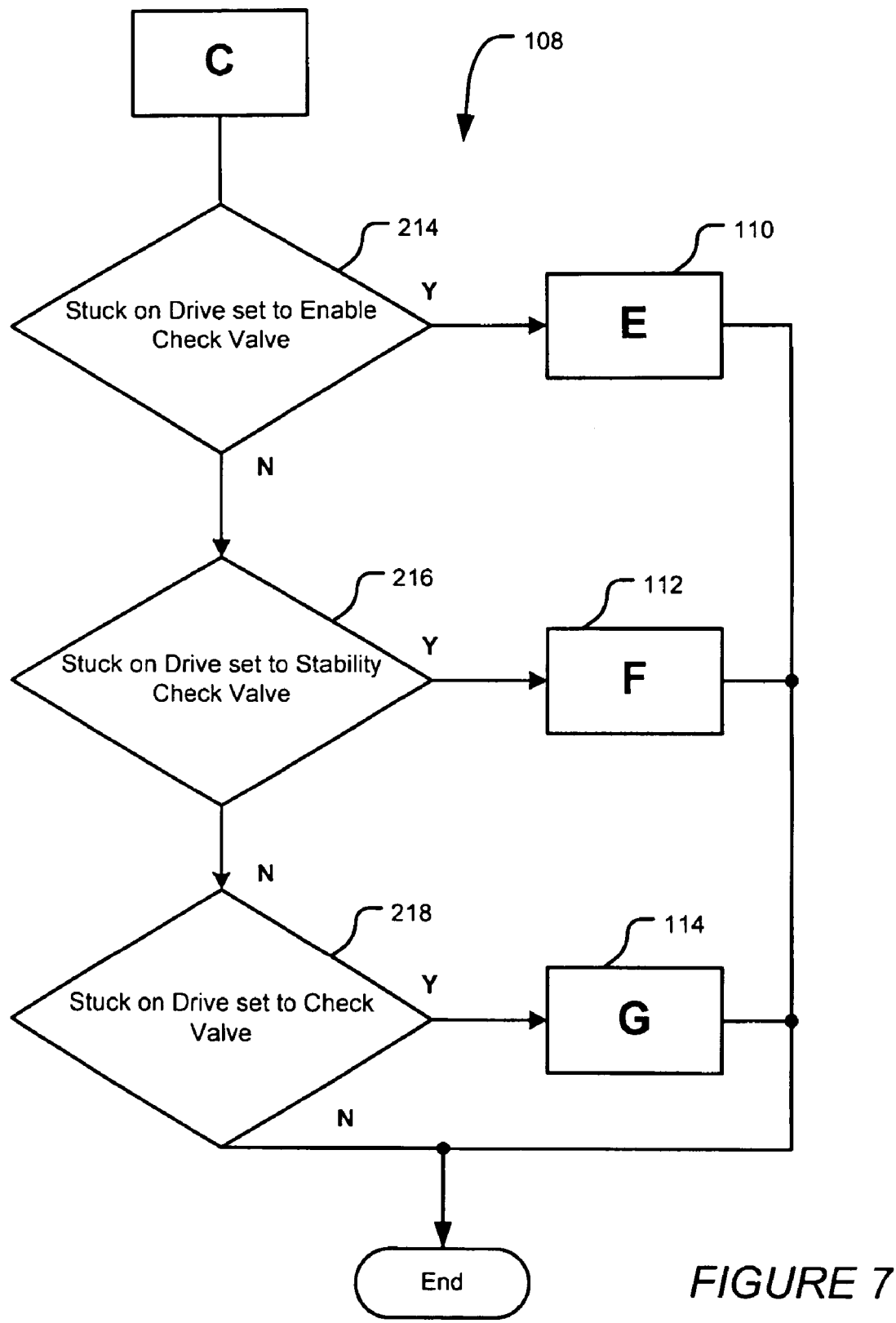
FIG. 7 is a flow chart representing a check valve module of the drive module of FIG. 6.
Figure 8:
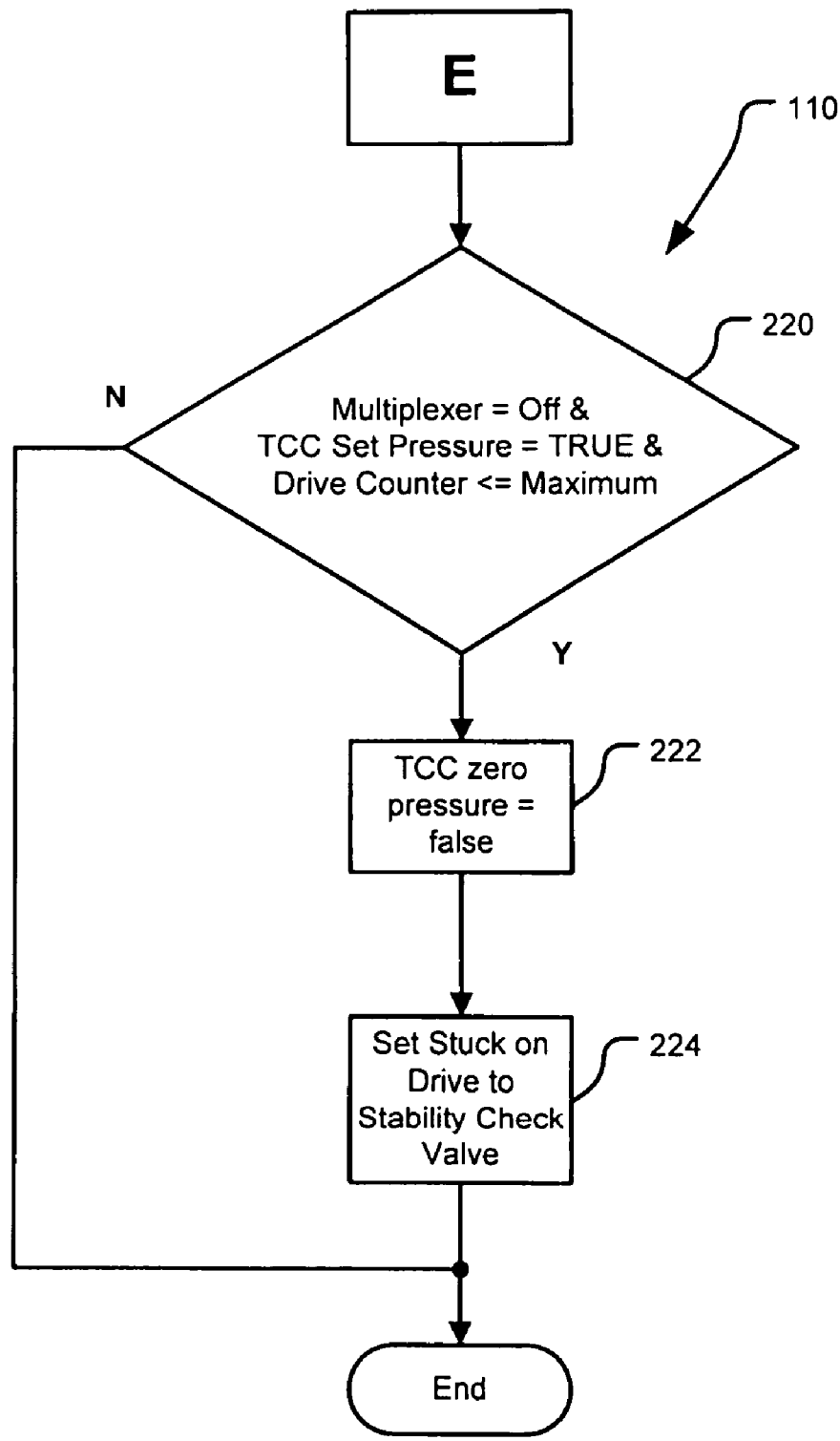
FIG. 8 is a flow chart representing an enable check valve module of the check valve module of FIG. 7.
Figure 9:
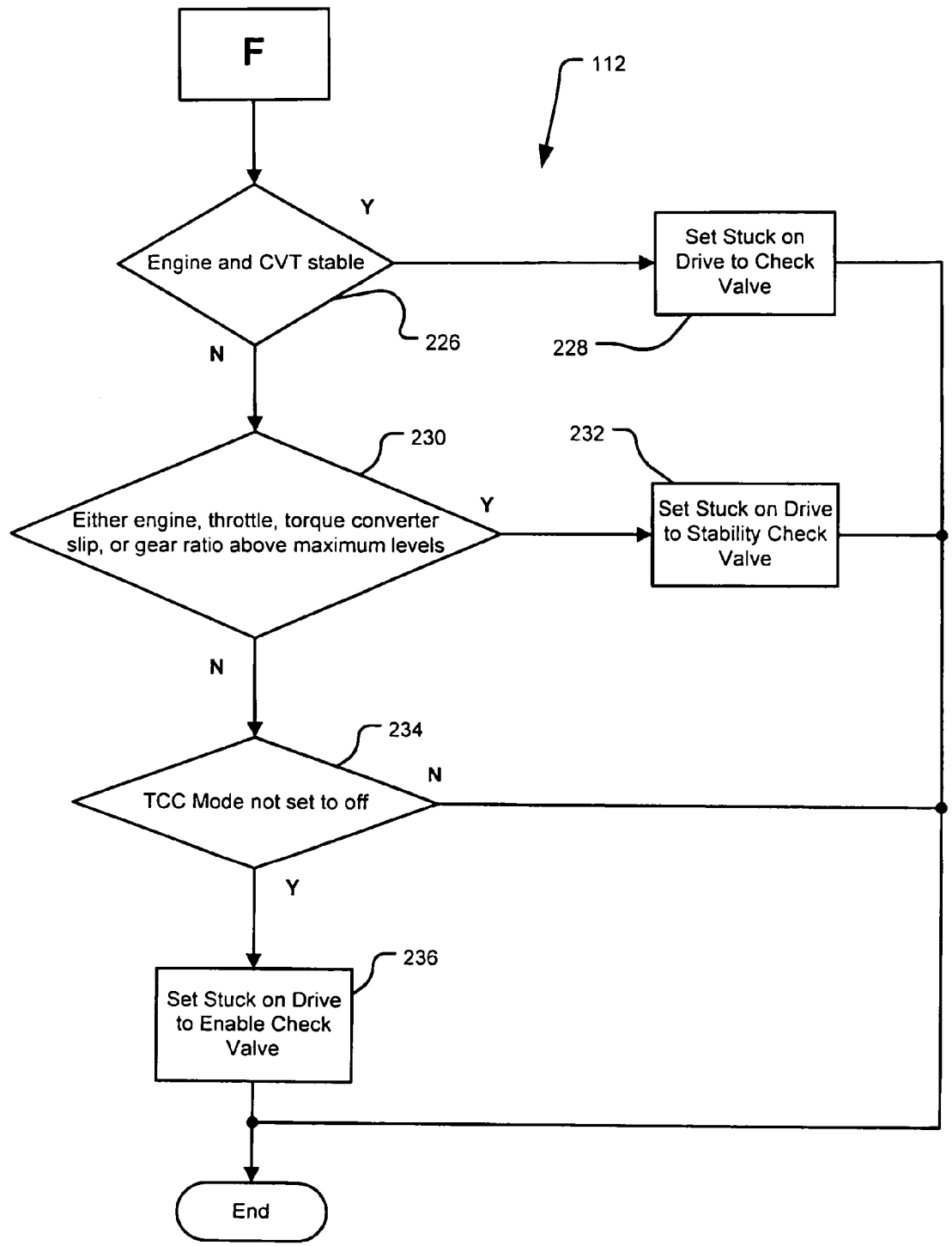
FIG. 9 is a flow chart representing a stability check valve module of the check valve module of FIG. 7.
Figure 10:
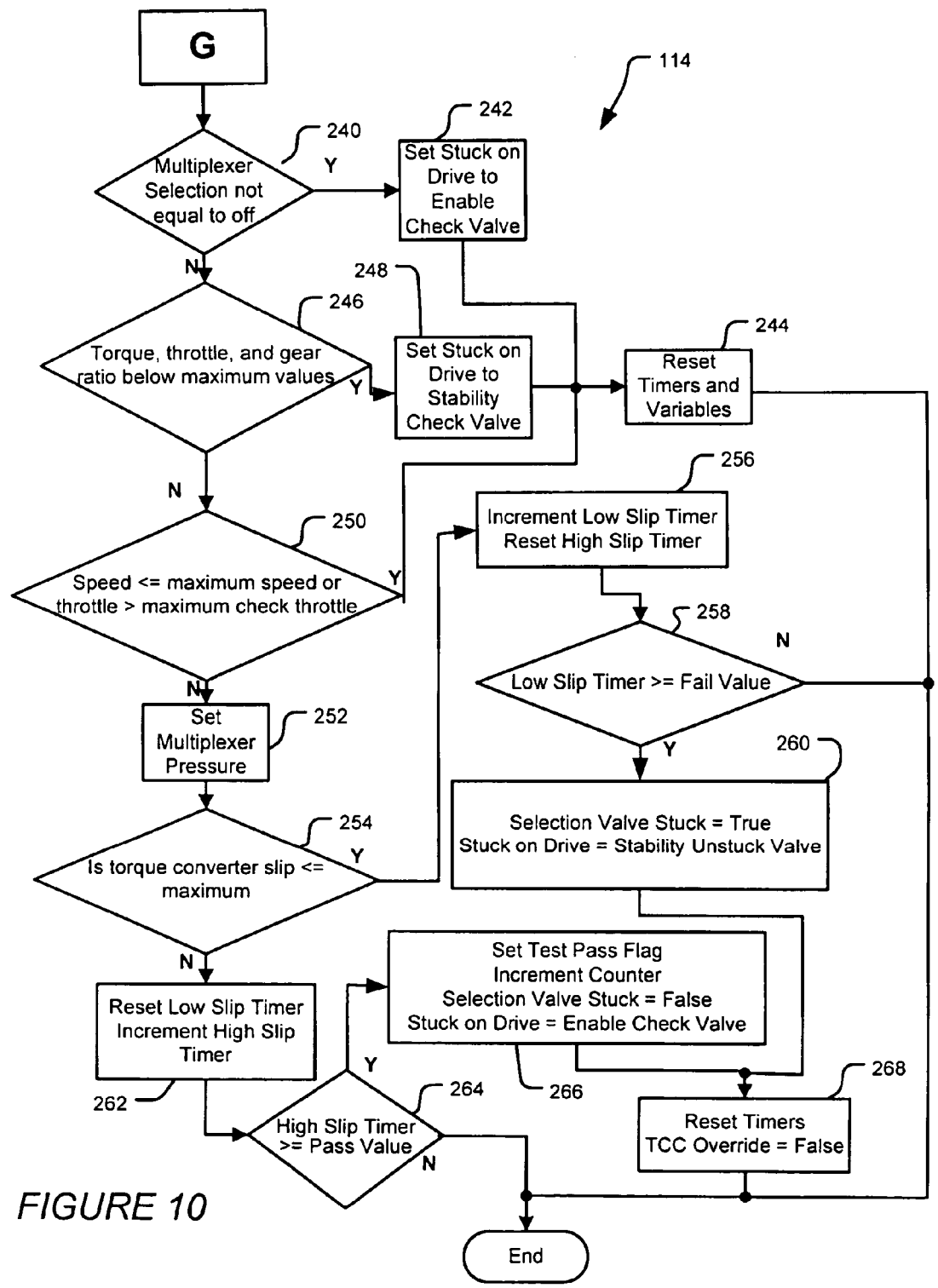
FIG. 10 is a flow chart representing a check valve module of the check valve module of FIG. 7.
Figure 11:
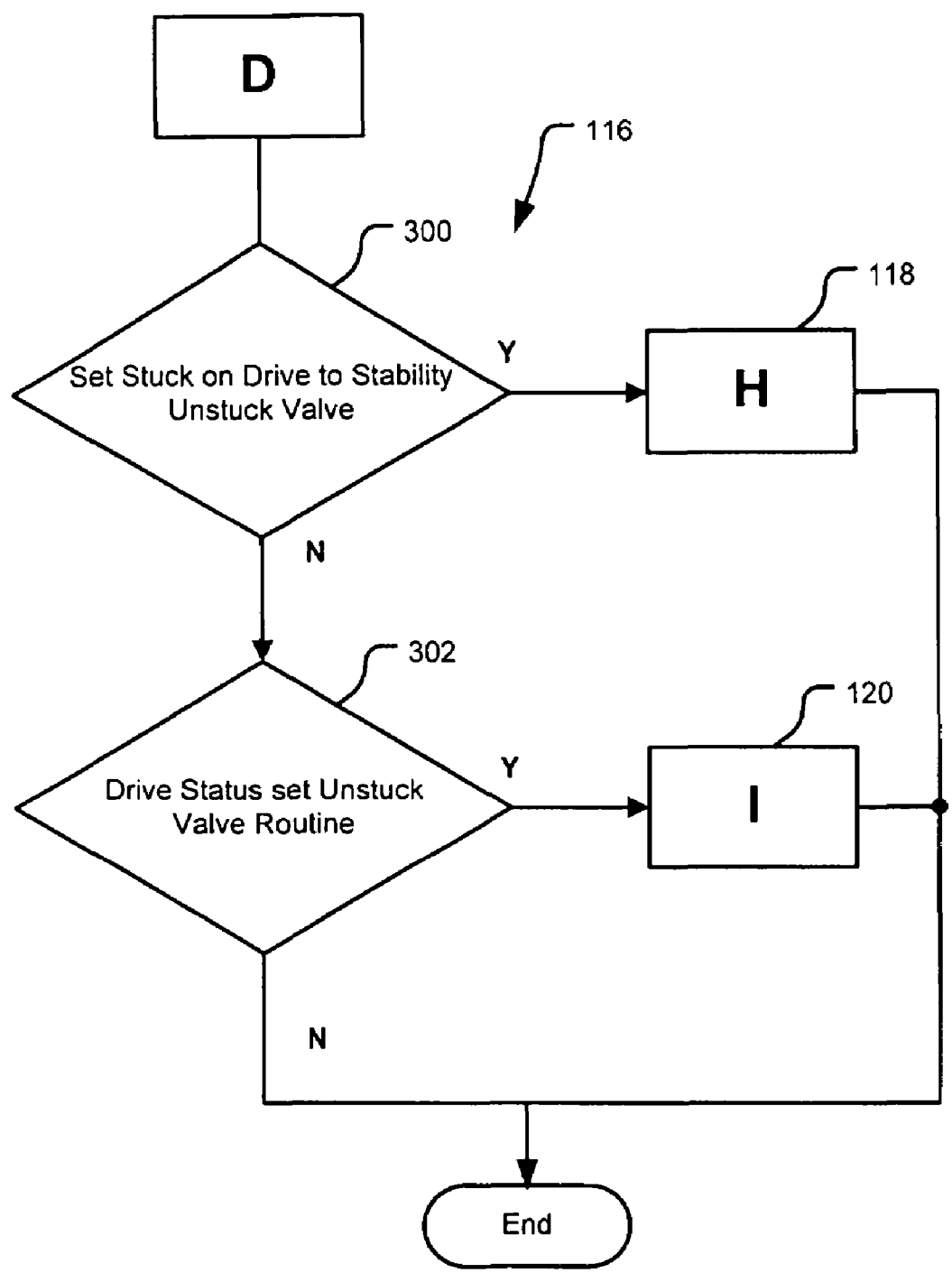
FIG. 11 is a flow chart representing an unstuck valve module of the drive module of FIG. 6.
Figure 12:
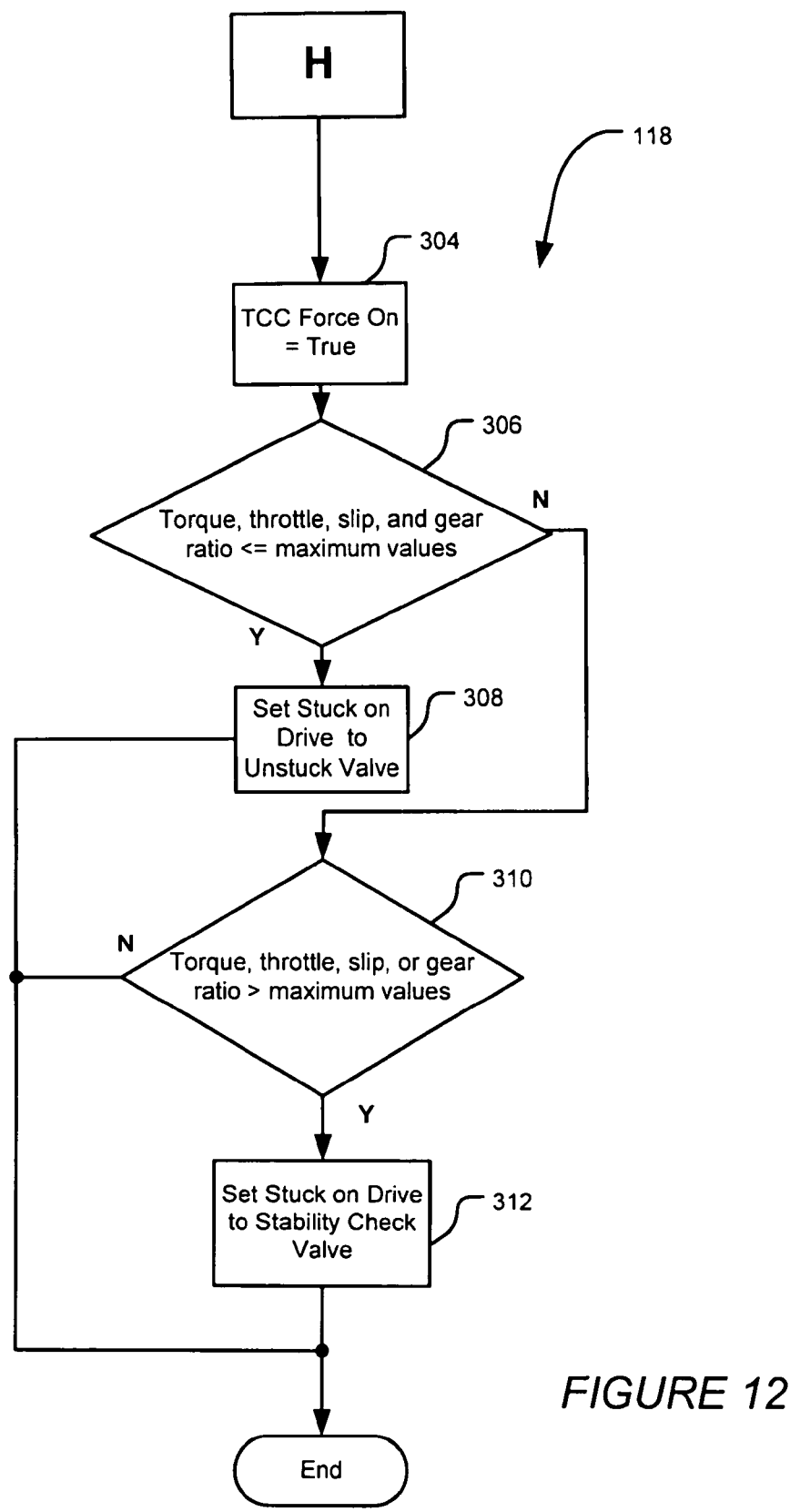
FIG. 12 is a flow chart representing a stability unstuck valve module of the unstuck valve module of FIG. 11.
Figure 13:
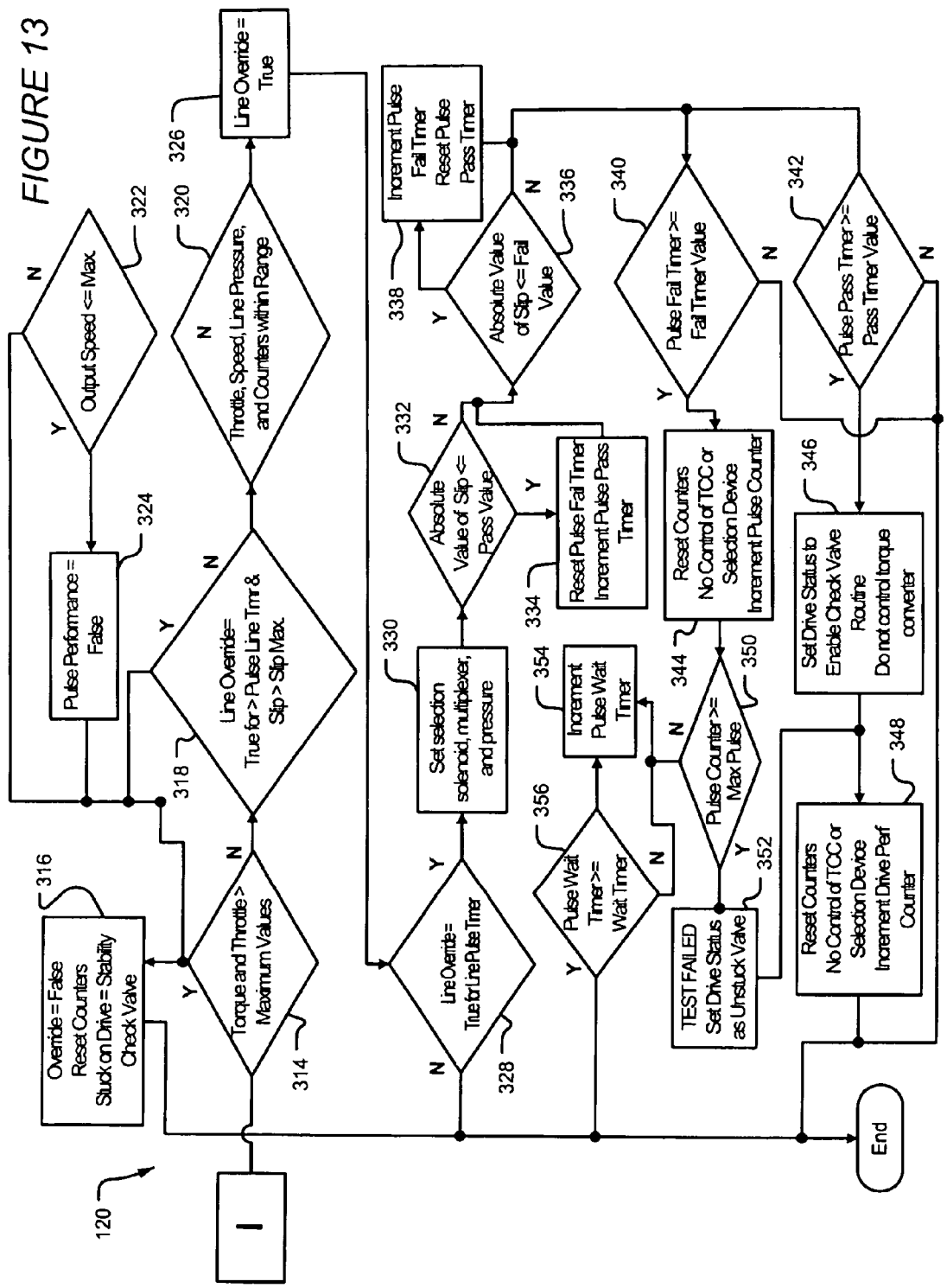
FIG. 13 is a flow chart representing an unstuck valve module of the unstuck valve module of FIG. 11.

The following description of the preferred embodiments is merely exemplary in nature and is in no way intended to limit the invention, its application, or uses. For purposes of clarity, the same reference numbers will be used in the drawings to identify similar elements. As used herein, the term module and/or device refers to an application specific integrated circuit (ASIC), an electronic circuit, a processor (shared, dedicated, or group) and memory that execute one or more software or firmware programs, a combinational logic circuit, or other suitable components that provide the described functionality With reference to FIGS. 4-13, a diagnostic system and method for detecting a multiplex device stuck in a position is generally indicated by reference number 100. With reference to FIG. 4, a continuously variable transmission (CVT) range determination module is generally indicated by reference number 102. The CVT range determination module 102 can proceed to either a park neutral module generally indicated by reference number 104 as shown in FIG. 5 or a drive module generally indicated by reference numeral 106 as shown in FIG. 6. The drive module 106 (FIG. 6) can proceed to a check valve module generally indicated by reference numeral 108 as shown in FIG. 7. The check valve module 108 can proceed to either an enable check valve module generally indicated by reference numeral 110 as shown in FIG. 8, a stability check valve module generally indicated by reference numeral 112 as shown in FIG. 9, or a check valve module generally indicated by reference numeral 114 as shown in FIG. 10. With reference to FIG. 6, the drive module 106 can also proceed to an unstuck valve module generally indicated with reference numeral 116 as shown in FIG. 11. The unstuck valve module 116 can proceed to either a stability unstuck valve module generally indicated by reference numeral 118 as shown in FIG. 12, or an unstuck valve module generally indicated by reference numeral 120 as shown in FIG. 13.

With reference to FIG. 4, the CVT range determination module 102 begins with step 122. In step 122, it is determined if the CVT range equals either high, intermediate, or low. It will be appreciated that high, intermediate, or low refer to various forward drive ranges of the CVT, in contrast to either reverse, park, or neutral. In step 122, if the CVT range is equal to either high, intermediate, or low, the CVT range determination module 102 proceeds to step 124.

In step 124, it is determined if the time since the CVT changed range is greater than or equal to, a certain amount of time equal to a stuck on park constant. If the time since the CVT changed range is greater than, or equal to the stuck on park constant the CVT range determination module 102 proceeds from step 124 to the drive module 106 as shown in FIG. 6. In step 124, if the time since the CVT changed range is less than the stuck on park constant, the CVT range determination module 102 proceeds to the park/neutral module 104 as shown in FIG. 5.

It will be appreciated that for clarity purposes, the method 100 is depicted across FIGS. 4-13. To make transitions between the Figures more clear, the reference letters "A" though "I" are used to indicate a transition to another figure. As shown in FIG. 4, for example, step 104 refers to the park/neutral module 104 of FIG. 5. It will be further appreciated that step 104 in FIG. 4 is merely a reference holder for the park/neutral module 104, which is depicted in FIG. 5.

In step 122, if the CVT range does not equal either high, intermediate, or low the CVT range determination module 102 proceeds to step 126. In step 126, if the CVT range equals either park or neutral the CVT range determination module 102 proceeds to the park/neutral module 104 as shown in FIG. 5. In step 126, if the CVT range does not equal either park or neutral, the CVT range determination module 102 proceeds to step 128.

In step 128, if the CVT range equals reverse, the CVT range determination module 102 proceeds to step 130. In step 130, if the time since the CVT changed range is less than the stuck on part constant, the CVT range determination module 102 proceeds to the park/neutral module 104 as shown in FIG. 5. In step 130, if the time since the CVT changed range is greater than, or equal to, the stuck on park constant, the CVT range determination module 102 ends. In step 128, if the CVT range is not equal to reverse, the CVT range determination module 102 ends and re-loops, if applicable.

With reference to FIG. 5, the first step of the park/neutral module 104 is step 132. In step 132, it is determined if the system has been initialized. It will be appreciated that when the diagnostic system and method 100 initially enters the park/neutral module 104, the system will be initialized. If this system has to be initialized the park/neutral module 104 proceeds from step 132 to step 134. In step 134, the system is reset.

In the various embodiments, the reset of the system entails setting the following timers to 0 seconds: Low slip timer, high slip timer, pulse pass timer, pulse fail timer, and pulse wait timer. Also reset in step 134 is the pulse counter, which is reset to 0 counts. In step 134, the following variables are also set to their respective values: Stuck on drive is set to initialization, TCC override is set to false, selection override is set to false, line override is set to false, and stuck on park variable is set to check park. After the completion of step 134, the park/neutral module 104 loops back to step 132. Because the variable stuck on park is set to check park, step 132 determines the system has already been initialized and proceeds to step 136.

In step 136 it is determined if the engine and the throttle are set at the proper settings and speeds. In the various embodiments, the following must be true for the park/neutral module 104 to proceed from step 136 to step 138. In step 136, it is determined if all of the following is true: (1) An engine speed variable is greater than or equal to a minimum engine speed constant, (2) engine speed derivative variable is greater than or equal to a minimum engine speed derivative constant, (3) a throttle position variable is less than or equal to a maximum park/neutral throttle constant, (4) the throttle position variable is less than or equal to the sum of a start up throttle constant and an offset constant, (5) a transmission output speed variable is less than or equal to a maximum park/neutral transmission output speed constant, and (6) a park/neutral performance counter is less than or equal to a maximum park/neutral performance counter constant. If all of the above statements are true, the park/neutral module 104 proceeds from step 136 to step 138. If one or more of the above statements in step 136 are not true, the park/neutral module 104 proceeds to step 160.

In step 138, it is determined if the CVT is in range. The CVT is in range if either of the following two statements is true. Is (1) the CVT range equal to either park or neutral for more than an amount of time equal to a minimum park/neutral timer constant? Is (2) the CVT range equal to either high, intermediate, low, or reverse for less than a maximum drive timer constant? If either of those two statements are true, the park/neutral module 104 moves from step 138 to step 140. If both statements are false, the park/neutral module 104 proceeds from step 138 to step 160.

In step 140, it is determined if system pressures are above a minimum. If an actual line pressure variable is greater than or equal to a minimum pressure constant for an amount of time equal to a minimum pressure timer constant, the park/neutral module 104 proceeds from step 140 to step 142. If the actual line pressure variable is less than the minimum pressure constant for a minimum pressure timer constant, the park/neutral module 140 proceeds to step 160. It will be appreciated that a temperature measurement may be used to determine transmission fluid pressure.

In step 142, it is determined if CVT is in either park or neutral. If the CVT range equals either park or neutral, the park/neutral module 104 proceeds from step 142 to step 144. If the CVT range is not in either park or neutral, the park/neutral module 104 proceeds from step 142 to step 146.

In step 144, TCC override is set to false. In the various embodiments, when the TCC override is set to false the TCC is not forced on. From step 144, the park/neutral module 104 proceeds to step 148. In step 146, TCC override is set to true and PCA override pressure is set to a park/neutral pressure constant. TCC override forces a PCA pressure not to turn on the selection solenoid. When the PCA override pressure variable is set to park/neutral pressure constant, the multiplex device transmission control system 10 internal pressure is set equal to that of the park/neutral pressure constant. Upon completion of step 146, the park/neutral module 104 proceeds to step 148.

In step 148, the park/neutral sample counter is incremented, the selection override variable is set to true, and the multiplex override enable variable is set to false. In the various embodiments, the park/neutral sample counter is a counter recording the number of times the park/neutral test 104 is performed. When the selection override is set to true, it indicates the method 10 will override the multiplexer control 16 to the position indicated by multiplexer override variable. As such, when the multiplexer override enable variable is set to false, it indicates the position to which the multiplexer control 16 will be overridden; such that false indicates off. Upon completion of step 148, the park/neutral module 104 proceeds to step 150.

In step 150, it is determined if (1) the diagnostic TCC slip variable is less than or equal to a park/neutral fail slip constant. It is also determined if (2) the engine speed variable is less than or equal to a maximum engine speed constant. If both are true, step 150 proceeds to step 152. If one or more are false, step 150 proceeds to step 154. In step 152, the park/neutral failed counter is incremented. From step 152, the park/neutral module 104 proceeds to step 154.

In step 154, it is determined if (1) the diagnostic TCC slip variable is greater than or equal to park/neutral pass slip constant. It is also determined if (2) the engine speed variable is less than or equal to the maximum engine speed constant. If both are true, the park/neutral module 104 proceeds from step 154 to step 156. If one or more are false, the park/neutral module 104 proceeds from step 154 to step 158. In step 156, the park/neutral pass counter is incremented. From step 156, the park/neutral module 104 proceeds to step 158.

In step 158, it is determined if the park/neutral sample counter is greater than or equal to a maximum sample constant. If yes, the park/neutral module proceeds from step 158 to step 160. If no, the park/neutral module 104 proceeds from step 158 back to step 132, which in turn causes the park/neutral module 104 to begin again.

In step 160, it is determined if the test failed because the multiplexer device 12 (FIG. 1) is stuck in the on position. To determine a failure, it is determined if (1) the park/neutral sample counter is greater than or equal to a minimum sample constant. It is also determined if (2) the park/neutral fail counter is greater than or equal to a fail counter. The fail counter is determined by multiplying the park/neutral sample counter by a fail percentage. If one or more of the above determinations are false, the park/neutral module 104 proceeds from step 160 to step 162. If both are true, the park/neutral module proceeds from step 160 to step 164.

In step 162, it is determined if (1) the park/neutral sample counter is greater than, or equal to, a minimum sample constant. It is also determined if (2) the park/neutral pass counter is greater or equal to a pass counter. The pass counter is computed by multiplying the park/neutral sample counter by a pass percentage. If one or more are false, the park neutral module 104 ends after step 162. If both are true, the park/neutral module 104 proceeds from step 162 to step 166. In step 166, it is indicated that the test passed. In step 164, it is indicated that the test failed. From either step 164 or step 166, the park/neutral module 104 proceeds to step 168.

In step 168, the park/neutral module 104 logs the data from the tests and resets the counters. More specifically the TCC override variable the set to false. The selection override variable is set to false. The line override variable is set to false. The park/neutral sample counter is set to zero counts. The park/neutral pass counter and the park/neutral fail counter are set to zero counts. The park/neutral performance counter is incremented. From step 168, the park/neutral module 104 ends.

Figure 1:
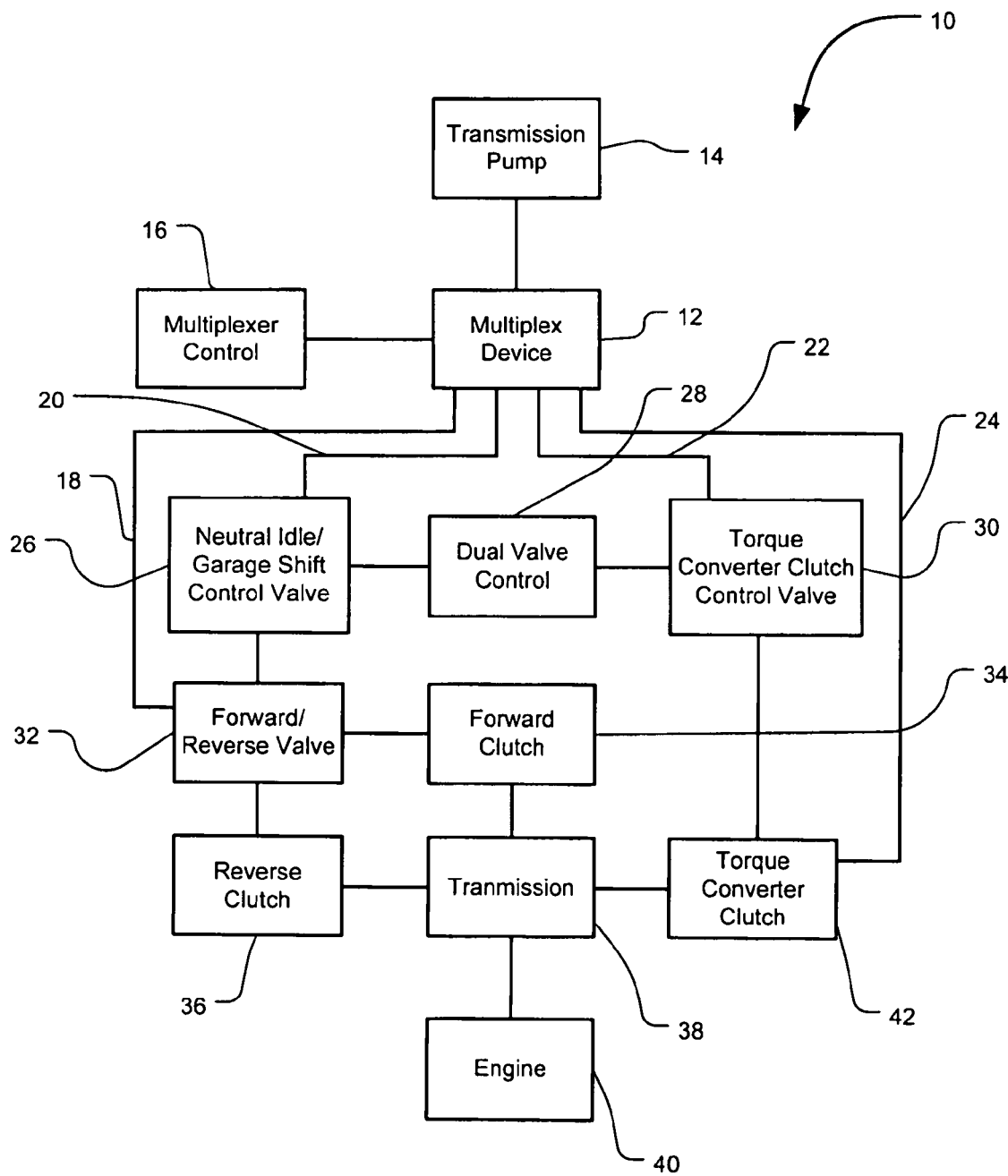
FIG. 1 is a functional block diagram of the multiplex device integrated with the automatic transmission constructed in accordance with the teachings of the present invention.

With reference to FIGS. 1 and 5, it should be appreciated that the park/neutral module 104 is attempting to determine if the multiplex device 12 is stuck in the on position. If the CVT is in either park or neutral, per step 142, the park/neutral module 104 will lock the TCC 42 per step 146. If the multiplex device 12 is not stuck and therefore in the off position, the TCC 42 will not lock. If, however, the multiplex device 12 is stuck in the on position, the TCC 42 will lock. If the TCC is locked due to the multiplex device 12 being stuck in the on position, step 150 will determine that the torque converter slip is less than or equal to the park/neutral fail slip constant, which is due to TCC being locked. If that determination is made, the park/neutral fail counter is incremented as shown in step 152.

As noted above, if the multiplex device 12 is not stuck and therefore in the off position, the torque converter will not lock. Even when the TCC control 30 is forced to the maximum position the TCC 42 will not close because the multiplex device 12 is in the off position. Because the multiplex device 12 is in the off position, the TCC control valve 30 is bypassed and the TCC 42 remains at a minimum pressure thus open.

With reference to FIG. 6, the drive module is generally indicated by reference numeral 106. The first step the drive module 106 is step 200. In step 200, it is determined if an initialization needs to be performed. In the various embodiments, and initialization is always initially performed. If an initialization has not yet been performed the drive module 106 proceeds from step 200 to step 202. If an initialization has already been performed, the drive module 106 proceeds from step 200 to step 210.

In step 202, the system is reset and counters are set to zero. More specifically, the TCC override enable variable is to set to false. The line override variable is set to false. The park/neutral pass counter, the park/neutral fail counter, and the park/neutral sample counter are set to zero counts. The stuck on park variable is set to initialization. From step 202, the drive module 106 proceeds to step to 204.

In step to 204, it is determined if (1) the selection valve stuck variable is equal to true. It is also determined if (2) the P0742 to error code is active. If neither are true, the drive module 106 proceeds from step 204 to step 206. If one or more are true, the drive module 106 proceeds from step 204 to step to 208. In step 206, the stuck on drive variable is set to enable check valve. In step 208, the stuck on drive variable is set to stability unstuck valve. From step 206 or step 208, the drive module 106 ends and reloops if applicable.

In step 210, it is determined if the stuck on drive variable is set to enable check valve. If yes, the drive module 106 proceeds from step 210 to the check valve module 108. If no, the drive module 106 proceeds from step 210 to step 212. In step 212, is determined if the stuck on drive variable is set to stability unstuck valve. If yes, the drive module 106 proceeds from step 212 to the unstuck valve module 116. If no, the drive module 106 ends after step 212.

With reference to FIG. 7, the check valve module is generally indicated by reference 108. The check valve module begins with step 214. In step 214, it is determined if the stuck on drive variable is set to enable check valve. If yes, the check valve module 108 proceeds from step 214 to the enable check valve module 110, as shown in FIG. 8. If no, the check valve module 108 proceeds from step 214 to step 216.

In step 216, it is determined if the stuck on drive variable is set to stability check valve. If yes, the check valve module 108 proceeds from step 216 to the stability check valve module 112, as shown in FIG. 9. If no, the check valve module 108 proceeds from step 216 to step 218.

In step 218, is determined if the stuck on drive variable is set to check valve. If yes, the check valve module 108 proceeds from step 218 to the check valve module 114, as shown in FIG. 10. If no, the check valve module 108 ends after step 218 and reloops if applicable.

With reference to FIG. 8, the enable check valve module is generally indicated by reference numeral 110. The enable check valve module starts with step 220. In step 220, it is determined if: (1) TCC zero pressure variable is equal to false. If it is false, the enable check valve module 110 proceeds from step 220 to step 221. In step 221, the TCC zero pressure variable is set to false, which does not force the TCC pressure to zero. If step 220 is true, the enable check valve module 110 proceeds from step 220 to step 222. In step 222, it is determined if: (1) multiplex enabled solenoid status variable is set to off. It is also determined if (2) the drive performance counter is less than or equal to a drive performance maximum constant. If all two are true, the enable check valve module 110 proceeds from step 222 to step 224. If one or more are false, the enable check valve module 110 ends after step 222 and reloops if applicable.

From step 222, the enable check valve module 110 proceeds to step 224. In step 224, the stuck on drive variable is set to stability check valve. From step 224, the enable check valve module 110 ends.

With reference to FIG. 9, the stability check valve module is generally indicated by reference numeral 112. The stability check valve module 112 begins with step 226. In step 226, it is determined if the engine and the CVT parameters are stable. More specifically, it is determined if (1) the diagnostic torque stability variable is less than or equal to the torque stability maximum constant. It is determined if (2) a diagnostic throttle stability variable is less than or equal to a throttle stability maximum constant. It is determined if (3) a diagnostic slip stability variable is less than or equal to a slip stability maximum constant. It is determined if (4) a diagnostic ratio stability variable is less than or equal to the ratio stability maximum constant for an amount of time equal to the check stability timer minimum constant. If all four are true, the stability check valve module 112 proceeds from step 226 to step 228. If one or more are false, the stability check valve module 112 proceeds from step 226 to step 230.

In the various embodiments, the diagnostic torque stability variable, the diagnostic throttle stability variable, the diagnostic slip stability variable, and the diagnostic ratio stability variable are determined by measuring true values from the engine and the CVT and multiplying those values by a filtering constant. For example, the diagnostic torque stability variable is determined by multiplying the measurement of CVT engine torque with a torque stability filter constant. This filtering process is similar for the remaining three variables, as the filter constant is identical for the respective variables.

In step 228, the stuck on drive variable is set to check valve. From step 228, the stability check valve module 112 ends. In step 230, it is determined if any engine or CVT variables are above maximum values. More specifically, it is determined if (1) the diagnostic torque stability variable is greater than the torque stability maximum constant. It is determined if (2) a diagnostic throttle stability variable is greater than a throttle stability maximum constant. It is determined if (3) a diagnostic slip stability variable is greater than a slip stability maximum constant. It is determined if (4) a diagnostic ratio stability variable is greater than the ratio stability maximum constant. If any of the four are true, the stability check valve module 112 proceeds from step 230 to step 232. If all are false, the stability check valve module 112 proceeds from step 230 to step 234.

In step 232, the stuck on drive variable is set to stability check valve. From step 232, the stability check valve module 112 ends. In step 234, it is determined if the TCC mode variable is not equal to off. If the TCC mode is not equal to off, the stability check valve module 112 proceeds from step 234 to step 236. If the TCC mode variable is equal to off, the stability check valve module 112 ends after step 234. In step 236, the stuck on drive variable is set to enable check valve. From step 236, the stability check valve module 112 ends.

With reference to FIG. 10, the check valve module is generally indicated by reference numeral 114. The check valve module 114 begins with step 240. In step 240, it is determined if the multiplexer enabled solenoid status variable is not equal to off. If the multiplexer enabled solenoid status variable is not equal to off, the check valve module 114 proceeds from step 240 to step 242. In step 242, the stuck on drive variable is set to enable check valve. From step 242, the check valve module 114 proceeds to step 244. In step 244, the timers and variables are reset. More specifically, the TCC override enable variable is set to false. The selection valve stuck variable is set to false. The selection override variable is set to false. The low slip timer is set to zero seconds and the high slip timer is set to zero seconds. From step 244, the check valve module 114 ends.

In step 240, if the multiplexer enabled solenoid status variable is equal to off, the check valve module 114 proceeds from step 240 to step 246. In step 246, it is determined if any engine variables are above maximum values. More specifically, it is determined if (1) the diagnostic torque stability variable is greater than the torque stability maximum constant. It is determined if (2) a diagnostic throttle stability variable is greater than a throttle stability maximum constant. It is determined if (3) a diagnostic ratio stability variable is greater than the ratio stability maximum constant. If any of the three are true, the check valve module 114 proceeds from step 246 to step 248. If all are false, the check valve module 114 proceeds from step 246 to step 250. In step 248, the stuck on drive variable is set to stability check valve. From step 248, the check valve module 114 proceeds to step 244, as discussed above, where the timers and variables are reset. From step 244, the check valve module 114 ends.

In step 250, it is determined if (1) the transmission output speed variable is less than or equal to a maximum transmission output speed constant. It is also determined if (2) if the throttle position variable is greater than a maximum check throttle constant. If one or more are true, the check valve module 114 proceeds from step 250 to step 244. If both are false, the check valve module 114 proceeds from step 250 to step 252.

In step 244, as discussed above, the timers and variables are reset. From step 244, the check valve module 114 ends. In step 252, the TCC override enable variable is set to true and TCC PCA override variable is set to a check pressure constant. From step 252, the check valve module 114 proceeds to step 254.

In step 254, it is determined if the torque converter slip is less than or equal to a maximum check fail slip constant. If the torque converter slip is less than or equal to a maximum check fail slip constant, the check valve module proceeds from step 254 to step 256. If the torque converter slip is greater than a maximum check fail slip constant, the check valve module proceeds from step 254 to step 262.

In step 256, the low slip timer is incremented and the high slip timer is reset to zero. From step 256, the check valve module 114 proceeds to step 258. In step 258, it is determined if the low slip timer is greater than or equal to a fail timer. If no, the check valve module 114 ends after step 258. If yes, the check valve module 114 proceeds from step 258 to step 260. In step 260, the selection valve stuck variable is set to true and the stuck on drive variable is set to stability unstuck valve. From step 260, the check valve module 114 proceeds to step 268.

In step 262, the low slip timer is reset and high slip timer is incremented. From step 262, the check valve module 114 proceeds to step 264. In step 264, it is determined if the high slip timer is greater or equal to a pass timer constant. If no, the check valve module 114 ends after step 264. If yes, the check valve module 114 proceeds from step 264 to step 266. In step 266, a test pass indicator is set. Also in step 266, the selection valve stuck variable is set to false, the driver performance counter is incremented, and the stuck on drive variable is set to enable check valve. From step 266, the check valve module 114 proceeds to step 268.

In step 268, the TCC override enable variable is set to false and both the low slip timer and the high slip timer are set to zero seconds. From step 268, the check valve module 114 ends and reloops if applicable. It will be appreciated that the check valve module 108 (FIG. 7) performs the enable check valve module 110 (FIG. 8) first and then the stability check valve module 112 (FIG. 9) next, followed by the check valve module 114 (FIG. 10). It will also be appreciated that the enable check valve module 110 (FIG. 8) initiates when the multiplexer control 16 (FIG. 1) is in the off position and will continue to loop until the test pass flag is set or until the maximum number of tests are reached per step 220 in FIG. 8.

After the enable check valve module 110 (FIG. 8) is complete, the check valve module 108 (FIG. 7) initiates the stability check valve module 112 (FIG. 9) to detect variations in the four engine and CVT parameters. More specifically, the stability check valve module 112 (FIG. 9) controls torque converter slippage, throttle position, engine torque, and gear ratio to determine if the engine and the CVT are stable enough to proceed to the check valve module 114 (FIG. 10). The check valve module 114 (FIG. 10) controls a certain pressure to the multiplexer 12 (FIG. 1) to see if TCC 42 will close to thus lock the torque converter. If the multiplexer 12 (FIG. 1) is not stuck, the change in pressure will not affect the TCC 42 (FIG. 1). If the multiplexer 12 (FIG. 1) is stuck on, such that the multiplexer 12 (FIG. 1) remains in the on position (FIGS. 2A and 2B) while the multiplexer control 16 (FIG. 1) is in the off position, the TCC 42 (FIG. 1) will begin to close locking the torque converter in response to the change in pressure, thus detecting the multiplexer 12 (FIG. 1) stuck on. If it is detected that the multiplexer 12 (FIG. 1) is stuck on, the drive module 106 (FIG. 6) proceeds to the unstuck valve module 116, as shown in FIG. 11.

With reference to FIG. 11, the unstuck valve module is generally indicated by reference numeral 116. The first step in the unstuck valve module 116 is step 300. In step 300, it is determined if the stuck on drive variable is set to stability unstuck valve. If yes, the unstuck valve module 116 proceeds from step 300 to the stability unstuck valve module 118, as shown in FIG. 12. If no, the unstuck valve module 116 proceeds from step 300 to step 302. In step 302, it is determined if the stuck on drive variable is set to unstuck valve. If yes, the unstuck valve module 116 proceeds from step 302 to the unstuck valve module 120, as shown in FIG. 13. If no, the unstuck valve module 116 ends after step 302.

With reference to FIG. 12, the stability unstuck valve module is generally indicated by reference numeral 118. The first step in the stability unstuck valve module 118 is step 304. In step 304, the TCC force on variable is set to true. From step 304, the stability unstuck valve module 118 proceeds to step 306. In step 306, it is determined if the four engine and CVT parameters are above maximum values. More specifically, it is determined if (1) the diagnostic torque stability variable is less than or equal to the torque stability maximum constant. It is determined if (2) a diagnostic throttle stability variable less than or equal to the throttle stability maximum constant. It is determined if (3)

the diagnostic slip stability variable less than or equal to the slip stability maximum constant. It is determined if (4) a diagnostic ratio stability variable less than or equal to the ratio stability maximum constant for an amount of time equal to the unstuck stability timer minimum constant. If any of the four are false, the stability unstuck valve module 118 proceeds from step 306 to step 308. If all four are true, the stability unstuck valve module 118 proceeds from step 306 to step 310.

In step 308, the stuck on drive variable is set to unstuck valve and the stability unstuck valve module 118 ends. In step 310, it is determined if (1) the diagnostic torque stability variable is greater than the torque stability maximum constant. It is determined if (2) a diagnostic throttle stability variable is greater than a throttle stability maximum constant. It is determined if (3) a diagnostic slip stability variable is greater than a slip stability maximum constant. It is determined if (4) a diagnostic ratio stability variable is greater than the ratio stability maximum constant. If all four are false, the stability unstuck valve module 118 ends after step 310. If any of the four are true, the stability unstuck valve module 118 proceeds from step 310 to step 312. In step 312, the stability timer is reset. After step 312, the stability unstuck valve module 118 ends.

With reference to FIG. 13, the unstuck valve module is generally indicated by reference numeral 120. The first step in the unstuck valve module 120 is step 314. In step 314, it is determined if (1) the diagnostic torque stability variable is greater than the torque stability maximum constant. It is determined if (2) a diagnostic throttle stability variable is greater than a throttle stability maximum constant. If one or more are true, the unstuck valve module 120 proceeds from step 314 to step 316. If both are false, the unstuck valve module 120 proceeds from step 314 to step 318.

In step 316, the selection override variable is set to false. The TCC override variable is set to false. The pulse pass timer, the pulse fail timer, and the pulse wait timer are set to zero seconds. The pulse counter is set to zero counts. The line override variable is set to false. The stuck on driver variable is set to stability unstuck valve. From step 316, the unstuck valve module 120 ends.

In step 318, it is determined if (1) the line override variable has been set to true for more than an amount of time equal to the pulse line timer constant. It is also determined if (2) the diagnostic slip stability variable is greater than the slip stability maximum constant. If both are true, the unstuck valve module 120 proceeds from step 318 to step 316 discussed above and then the unstuck valve module 120 ends after step 316. If one or more are false, the unstuck valve module 120 proceeds from step 318 to step 320.

In step 320, it is determined if (1) the throttle position variable is less than or equal to an unstuck maximum throttle constant. It determined if (2) the transmission output speed variable is less than or equal to the maximum transmission output speed constant and greater than, or equal to, the minimum output transmission speed constant. It is determined if (3) the transmission line pressure less than or equal to the sum of a priority pressure constant minus an offset constant. It is determined if (4) the drive performance counter is less than or equal to the drive performance maximum constant. It is determined if (5) pulse performance variable is equal to false. If one or more are false, the unstuck valve module 120 proceeds from step 320 to step 322. If all five are true, the unstuck valve module 120 proceeds from step 320 to step 326.

In step 322, it is determined if the transmission output speed variable is less than or equal to a transmission output speed maximum constant. If yes, the unstuck valve module 120 proceeds from step 322 to step 324. If no, the unstuck valve module 120 proceeds from step 322 to 316 discussed above. In step 324, the pulse performance variable is set to false. From step 324, the unstuck valve module 120 proceeds to step 316. From step 316, the unstuck valve module 120 ends.

In step 326, the line override variable is set to true, which results in a minimum transmission pressure. From step 326, the unstuck valve module 120 proceeds to step 328. In step 328, it is determined if the line override variable is equal to true for a given amount of time equal to the line pulse timer. If no, the unstuck valve module 120 proceeds from step 328 ends. If yes, the unstuck valve module 120 proceeds from step 328 to step 330.

In step 330, the TCC override variable is set to true. The PCA override pressure variable is set to the lesser valve of either the sum of the PCA pressure constant plus an offset constant or the maximum pulse pressure constant. The selection override variable is set to true and multiplexer enabled override variable is set to false. From step 330, the unstuck valve module 120 proceeds to step 332.

In step 332, it is determined if the absolute value of the torque converter slip variable is greater than or equal to the pass torque converter slip constant. If yes, the unstuck valve module 120 proceeds from step 332 to step 334. If no, the unstuck valve module 120 proceeds from step 332 to step 336. In step 334, the pulse fail timer is reset and the pulse pass timer is incremented. From step 334, the unstuck valve module 120 proceeds to step 336. In step 336, it is determined if the absolute value of the torque converter slip variable is less than or equal to the fail torque converter slip constant. If yes, the unstuck valve module 120 proceeds from step 336 to step 338. If no, the unstuck valve module 120 proceeds from step 336 to step 340 and step 342. In step 338, the pulse fail timer is incremented and the pulse pass timer is reset. From step 338, the unstuck valve module 120 proceeds to step 340 and step 342.

In step 340, it is determined if the pulse fail timer is greater than or equal to the fail timer constant. If no, the unstuck valve module 120 proceeds ends after step 340. If yes, the unstuck valve module 120 proceeds from step 340 to step 344. In step 342, it is determined if the pulse pass timer greater than the pass timer constant. If no, the unstuck valve module 120 proceeds ends after step 342. If yes, the unstuck valve module 120 proceeds from step 342 to step 346.

In step 346, the stuck on drive variable is set to enable check valve, the zero pressure variable is set to true, and the TCC force on variable is set to false. From step 346, the unstuck valve module 120 proceeds to step 348. In step 348, the following variables are set to false: Valve stuck, TCC override, selection override, and line override. The following timers are set to zero seconds: Pulse pass timer, pulse wait timer, and pulse fail timer. The pulse counter is set to zero counts and the drive performance counter is incremented. From step 348, the unstuck valve module 120 ends and reloops if applicable.

In step 344, the TCC override variable and the selection override variable are set to false. The pulse pass, the pulse fail, and the pulse wait timers are set to zero seconds. The pulse counter is incremented. From step 344, the unstuck valve module 120 proceeds to step 350. In step 350, it is determined if the pulse counter variable is greater than or equal to the maximum pulse constant. If yes, the unstuck valve module 120 proceeds from step 350 to step 352. If no, the unstuck valve module 120 proceeds from step 350 to step 354.

In step 352, the test failed flag is set and the stuck on drive variable is set to unstuck valve. From step 352, the unstuck valve module 120 proceeds back to step 348, as discussed above. From step 348, the unstuck valve module 120 ends. In step 354, the pulse wait timer is incremented. From step 354, the unstuck valve module 120 proceeds to step 356. In step 356, it is determined if the pulse wait timer is greater than or equal to wait timer constant. If no, the unstuck valve module 120 proceeds from step 356 back to step 354. In step 354, the pulse wait timer is incremented and the unstuck valve module proceeds back to step 356. In step 356, if the pulse wait timer is greater than or equal to wait timer constant, the unstuck valve module 120 ends.

Figure 2A:
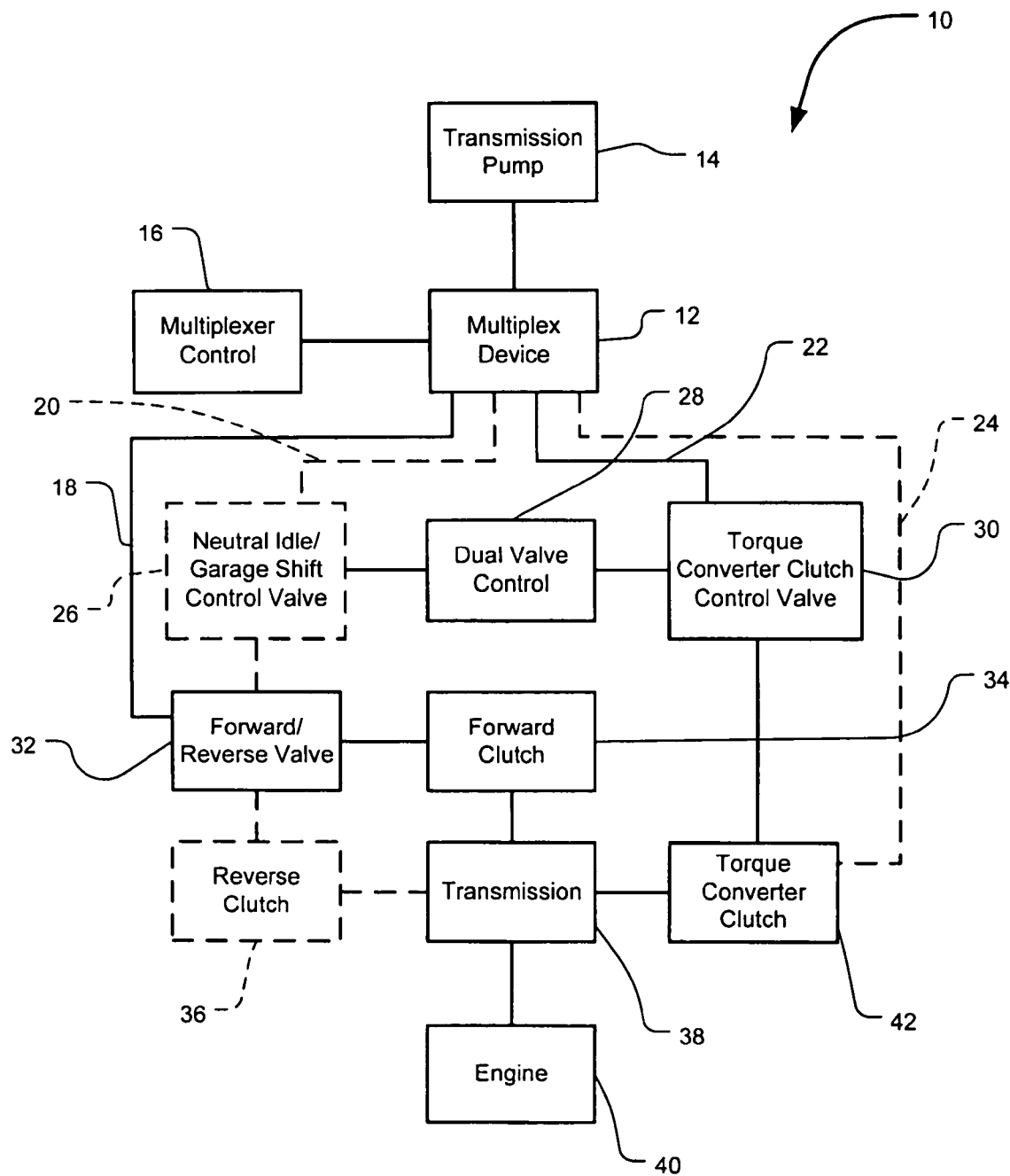
FIG. 2A is a functional block diagram of the multiplex device of FIG. 1 showing the multiplex device in the on position and the forward/reverse valve in the forward position.
Figure 2B:
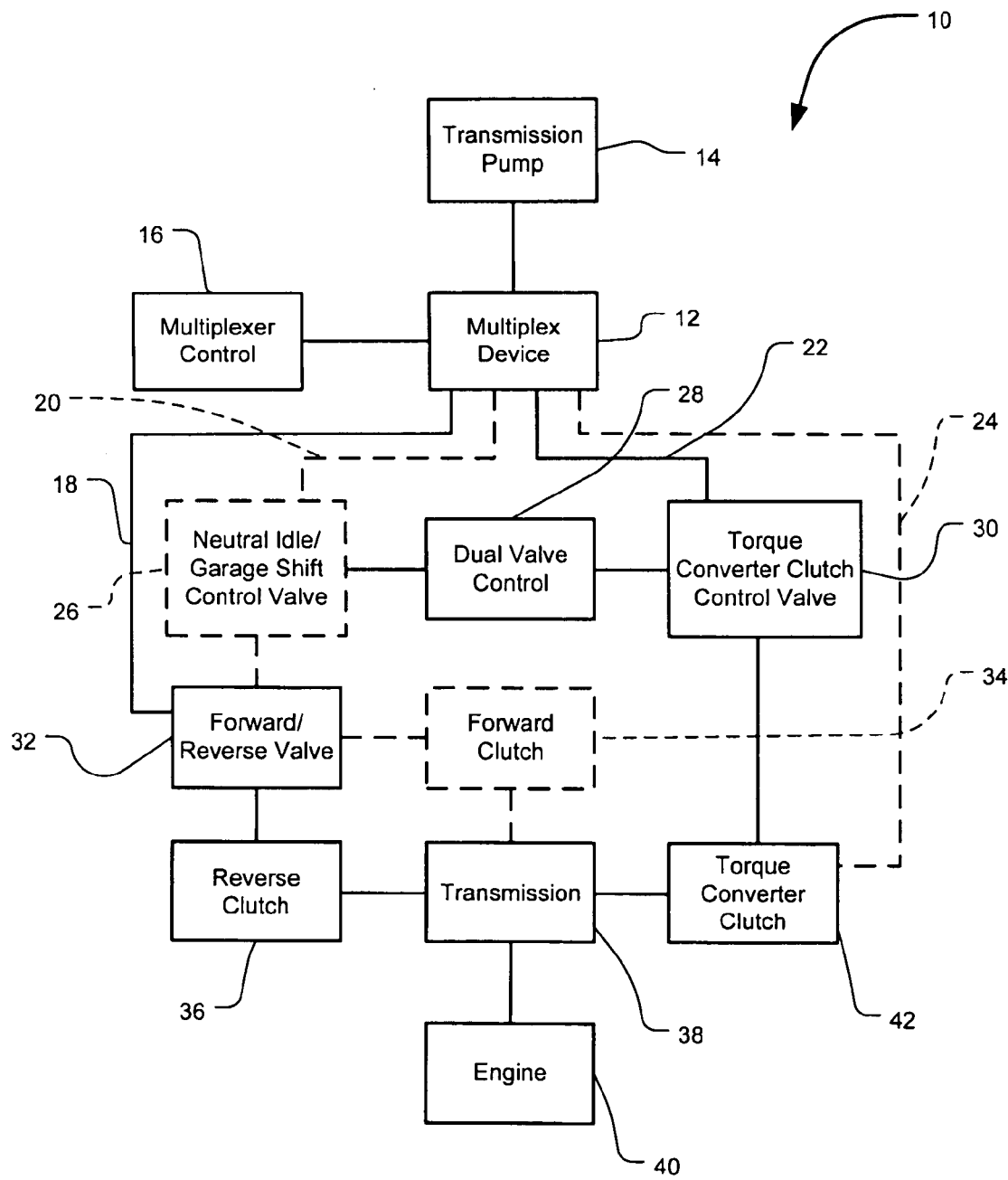
FIG. 2B is a functional block diagram of the multiplex device of FIG. 1 showing the multiplex device in the on position and the forward/reverse valve in the reverse position.

It will be appreciated that the unstuck valve module 116 (FIG. 11) begins with the stability unstuck valve module 118 (FIG. 12), which is a similar engine and CVT stability criteria check to the stability check valve module 112, as shown in FIG. 9. Once the stability criteria is satisfied, the unstuck valve module 116 (FIG. 11) proceeds to the main portion of the module 116, which is the unstuck valve module 120, as shown in FIG. 13. The unstuck valve module 120 (FIG. 13) determines whether to unstuck the multiplexer 12 (FIG. 1) if it is stuck in the on position (FIGS. 2A and 2B).

Before the unstuck valve module 120 is performed the transmission must be at the appropriate output speed, which is between the transmission minimum output speed constant and the transmission maximum output speed constant. Also prior to performing the unstuck valve module 120 the vehicle must be in a coast condition, such that the throttle position is less than or equal to a unstuck maximum throttle position constant and the engine or CVT are not in a priority mode. In the various embodiments the priority modes refer to situations where engine and CVT control are governed by specific look-up tables.

Figure 3A:
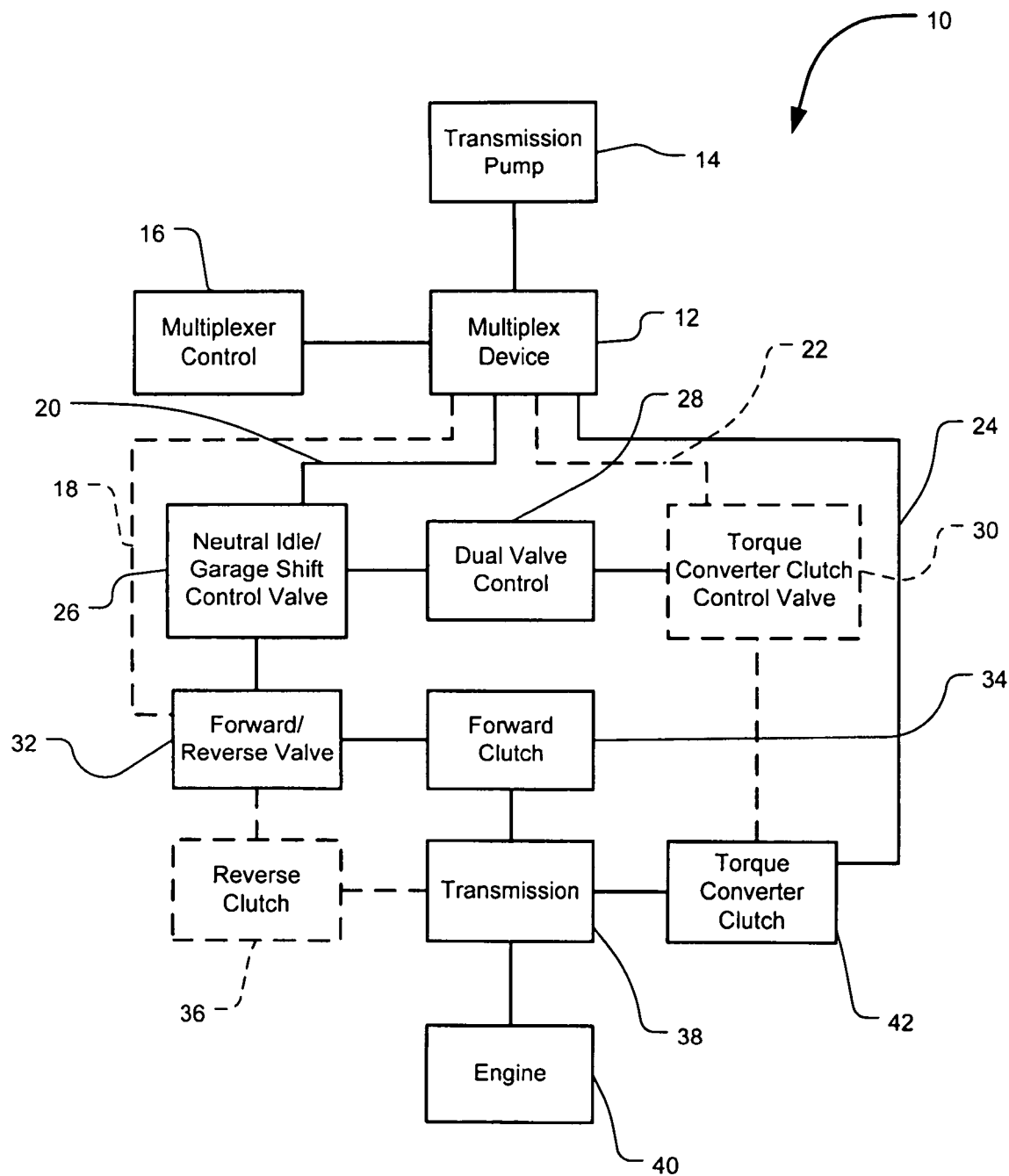
FIG. 3A is a functional block diagram of the multiplex device of FIG. 1 showing the multiplex device in the off position and the forward/reverse valve in the forward position.
Figure 3B:
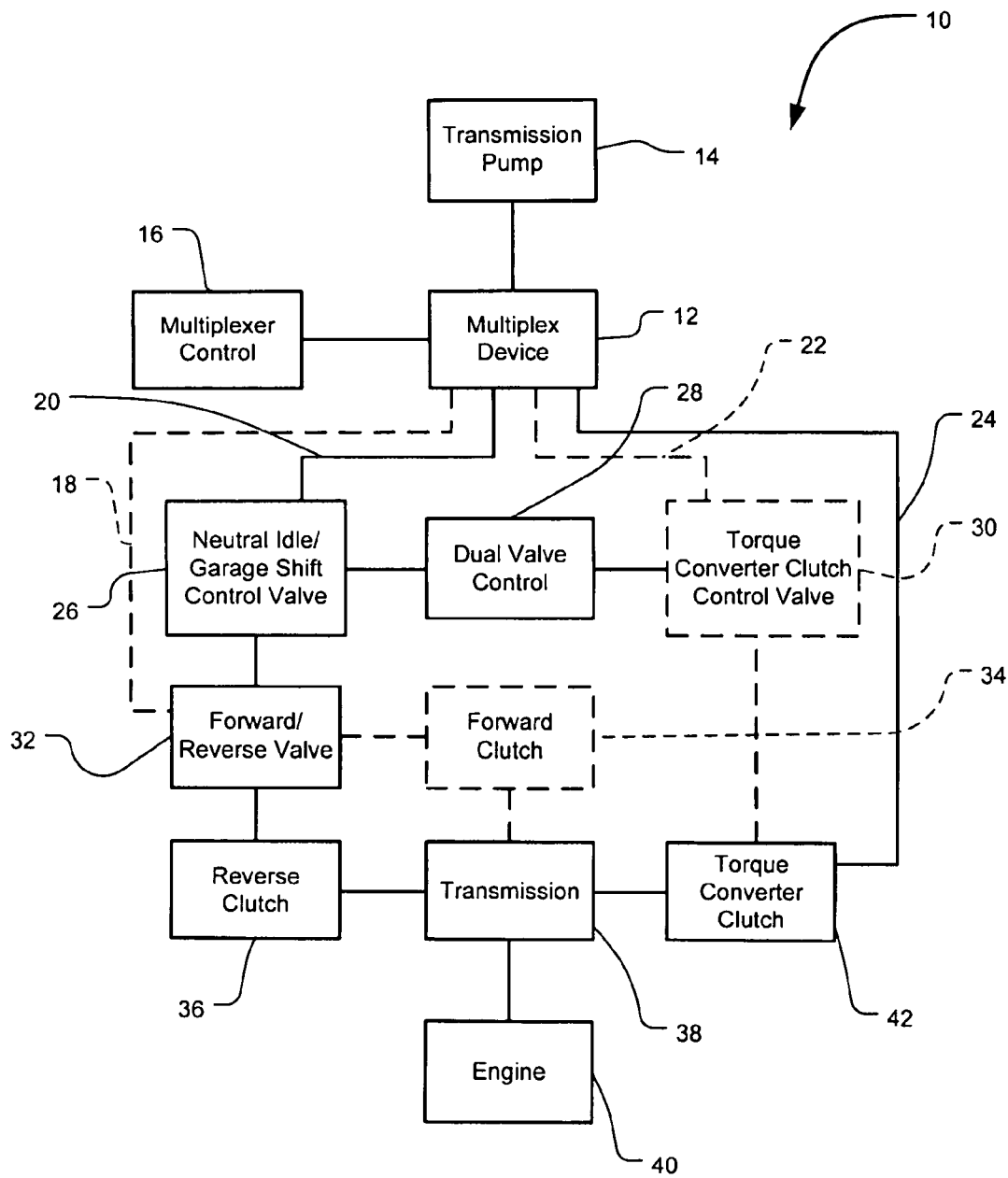
FIG. 3B is a functional block diagram of the multiplex device of FIG. 1 showing the multiplex device in the off position and the forward/reverse valve in the reverse position.

With all of the specific criteria satisfied, the unstuck valve module 120 will pulse the multiplexer 12 (FIG. 1) by turning off and turning on the multiplexer control 16 (FIG. 1). After pulsing the multiplexer control 16 (FIG. 1) a certain pressure is set in the multiplexer 12 (FIG. 1) and the multiplexer control 16 (FIG. 1) is set to off, which should move the multiplexer to the off position (FIGS. 3A and 3B) if it is not stuck. If the multiplexer device 12 (FIG. 1) is stuck in the on position (FIGS. 2A and 2B), the TCC will begin to close. With the TCC 42 (FIG. 1) closed and the torque converter locked, the unstuck valve module 120 will determine if the torque converter slippage is less than a fail threshold for at least a minimum amount of time. The unstuck valve module 120 will continue to poll torque converter slippage (or lack thereof) up to a maximum time. If threshold amount of slippage is not detected, the engine and CVT will set an error code to inform the driver that the vehicle needs service, as the multiplexer 12 (FIG. 1) is stuck in the on position.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification, and the following claims.

What is claimed is:

1. A system for fluid delivery in a continuously variable transmission comprising:
    a valve assembly having a first position and a second position, said valve assembly configured to distribute a fluid;
    one of a forward clutch and a reverse clutch in fluid communication with said valve assembly, wherein said valve assembly in said first position regulates one of said forward clutch and said reverse clutch and in said second position closes one of said forward clutch and said reverse clutch;
    a torque converter in fluid communication with said valve assembly, wherein said valve assembly in said first position opens the torque converter and in said second position regulates said torque converter; and
    a controller monitoring a transmission range, operating said valve assembly based on said transmission range, detecting said valve assembly stuck in said second position based on said transmission range, and pulsing said valve assembly when stuck in said second position.

2. The system of claim 1, wherein said valve assembly in said first position regulates one of said forward clutch and said reverse clutch between an open position, a closed position, and a plurality of positions therebetween.

3. The system of claim 1, wherein said valve assembly in said second position regulates said torque converter between an open position, a closed position, and a plurality of positions therebetween.

4. The system of claim 1 wherein said controller detects slippage of said torque converter to determine if said valve assembly is stuck in said second position.

5. A system for fluid delivery in a continuously variable transmission comprising:
    a valve assembly having a first position and a second position, said valve assembly configured to distribute a fluid;
    one of a forward clutch and a reverse clutch connected to said valve assembly, wherein said valve assembly in said first position regulates one of said forward clutch and said reverse clutch and in said second position closes one of said forward clutch and said reverse clutch;
    a torque converter connected to said valve assembly, wherein said valve assembly in said first position opens the torque converter and in said second position regulates said torque converter; and
    a controller monitoring a transmission range, operating said valve assembly based on said transmission range, detecting said valve assembly stuck in said second position based on said transmission range, wherein said controller pulses said valve assembly in said second position to unstuck said valve assembly.

6. A method of controlling a multiplex device in a continuously variable transmission comprising:
    supplying fluid pressure to the multiplex device having a first position and a second position;
    regulating one of a forward clutch and a reverse clutch when the multiplex device is in said first position, wherein said one of said forward clutch and said reverse clutch is maintained at a constant fluid pressure when the multiplexing device is in said second position;
    regulating a torque converter clutch when the multiplex device is in said second position, wherein said torque converter is maintained at a constant fluid pressure when the multiplex device is in said first position;
    monitoring a transmission range;

operating the multiplex device based on said transmission range;

detecting the multiplex device stuck in said second position based on said transmission range; and pulsing the multiplex device when stuck in said second position.

7. The method of claim 6 further comprising detecting slippage from the torque converter to determine if the multiplex device is stuck in said second position.

8. The method of claim 7 further comprising detecting slippage from the torque converter to determine if the multiplex device is stuck in said second position in about six seconds.

9. A method of controlling a multiplex device in a continuously variable transmission comprising:

supplying fluid pressure to the multiplex device having a first position and a second position;

regulating one of a forward clutch and a reverse clutch when the multiplex device is in said first position, wherein said one of said forward clutch and said reverse clutch is maintained at a constant fluid pressure when the multiplexing device is in said second position;

regulating a torque converter clutch when the multiplex device is in said second position, wherein said torque converter is maintained at a constant fluid pressure when the multiplex device is in said first position;

monitoring a transmission range;

operating the multiplex device based on said transmission range;

detecting the multiplex device stuck in said second position based on said transmission range; and pulsing the multiplex device stuck in said second position to unstuck the multiplex device.

10. A method of controlling a valve assembly in a transmission comprising:

supplying fluid pressure to a first valve assembly, wherein the first valve assembly has a first position and a second position;

monitoring a transmission range;

operating the first valve assembly to said first position based on said transmission range;

commanding a maximum pressure to a second valve assembly;

detecting the first valve assembly stuck in said second position based on a torque converter slip.

11. The method of claim 10 wherein said detecting the first valve assembly stuck in said second position is performed when said transmission range is one of park and neutral.

12. The method of claim 10 wherein a transmission fluid temperature is above eighty degrees Celsius.

13. The method of claim 10 further comprising:

monitoring operating parameters for stability;

detecting the first valve assembly stuck in said second position when said operating parameters are stable; and pulsing the first valve assembly to unstuck the valve assembly.

14. The method of claim 13 wherein said monitoring operating parameters for stability further comprises monitoring at least one of gear ratio, torque converter slip, throttle position, and engine torque.

15. The method of claim 13 wherein said detecting the first valve assembly stuck in said second position when said operating parameters are stable is performed when said transmission range is one of drive and low.

* * * * *